United States Patent
Scott et al.

(10) Patent No.: US 11,129,261 B2
(45) Date of Patent: Sep. 21, 2021

(54) LUMINAIRE AND DUPLEX SOUND INTEGRATION

(71) Applicant: ABL IP HOLDING LLC, Conyers, GA (US)

(72) Inventors: Jeffrey M. Scott, San Pablo, CA (US); Min-Hao Michael Lu, Castro Valley, CA (US); David P. Ramer, Reston, VA (US); Yan Rodriguez, Suwanee, GA (US)

(73) Assignee: ABL IP HOLDING LLC, Conyers, GA (US)

( * ) Notice: Subject to any disclaimer, the term of this patent is extended or adjusted under 35 U.S.C. 154(b) by 642 days.

(21) Appl. No.: 16/043,736

(22) Filed: Jul. 24, 2018

(65) Prior Publication Data

US 2020/0037419 A1    Jan. 30, 2020

(51) Int. Cl.
| | |
|---|---|
| *H05B 47/19* | (2020.01) |
| *F21V 33/00* | (2006.01) |
| *H05B 45/00* | (2020.01) |
| *H05B 45/10* | (2020.01) |

(52) U.S. Cl.
CPC ......... *H05B 47/19* (2020.01); *F21V 33/0056* (2013.01); *H05B 45/00* (2020.01); *H05B 45/10* (2020.01); *H05B 45/60* (2020.01)

(58) Field of Classification Search
CPC .................................................. F21V 33/0056
USPC ..................................................... 362/86–88
See application file for complete search history.

(56) References Cited

U.S. PATENT DOCUMENTS

| | | | |
|---|---|---|---|
| 6,548,967 | B1 | 4/2003 | Dowling et al. |
| 9,303,863 | B2 | 4/2016 | Vaidya |
| 9,462,663 | B2 | 10/2016 | Aggarwal et al. |
| 9,883,570 | B1 | 1/2018 | Turvy et al. |
| 9,916,738 | B2 | 3/2018 | Lashina et al. |
| 2014/0049939 | A1* | 2/2014 | Kuenzler ............... F21S 8/04 362/84 |
| 2014/0354160 | A1* | 12/2014 | Aggarwal ............. H05B 31/50 315/152 |
| 2018/0035187 | A1* | 2/2018 | Cook ..................... H04R 9/022 |

OTHER PUBLICATIONS

U.S. Appl. No. 15/631,441, dated Jun. 23, 2017, 61 pages.
U.S. Appl. No. 15/866,659, dated Jan. 10, 2018, 61 pages.
U.S. Appl. No. 15/933,752, dated Mar. 23, 2018, 56 pages.
U.S. Appl. No. 15/948,401, dated Apr. 9, 2018, 41 pages.

(Continued)

*Primary Examiner* — William J Carter
(74) *Attorney, Agent, or Firm* — RatnerPrestia

(57) ABSTRACT

The lighting device includes a luminaire, duplex circuitry, a lighting control device to control a light output and operation of a light source in a vicinity of the luminaire, and a sound transducer integrated on a surface of an element of the luminaire. The sound transducer responds to vibrations of the luminaire element to detect incoming audio waves and generates outgoing audio waves in the vicinity of the luminaire. The duplex circuitry is coupled to electrical terminals of the sound transducer and configured to generate a first electrical signal of the incoming audio waves, and supply a second electrical signal to cause the sound transducer to generate the outgoing audio waves in the vicinity of the luminaire that are directly proportional to the second electrical signal.

21 Claims, 15 Drawing Sheets

(56) References Cited

OTHER PUBLICATIONS

Recessed Speaker Light with Bluetooth Wireless Technology, https://www.acuitybrands.com/brands/lighting/lithonia-lighting/speakerlight.
DigiKey Electronics ASX03604R, Digi-Key Part No. 668-1560-ND, www.digikey.com/products, searched Nov. 5, 2018.
Radio Shack, "Understanding Telephone Electronics," The Conventional Telephone Set, pp. 2-20-2-24, Texas Instruments Learning Center (1983).

* cited by examiner

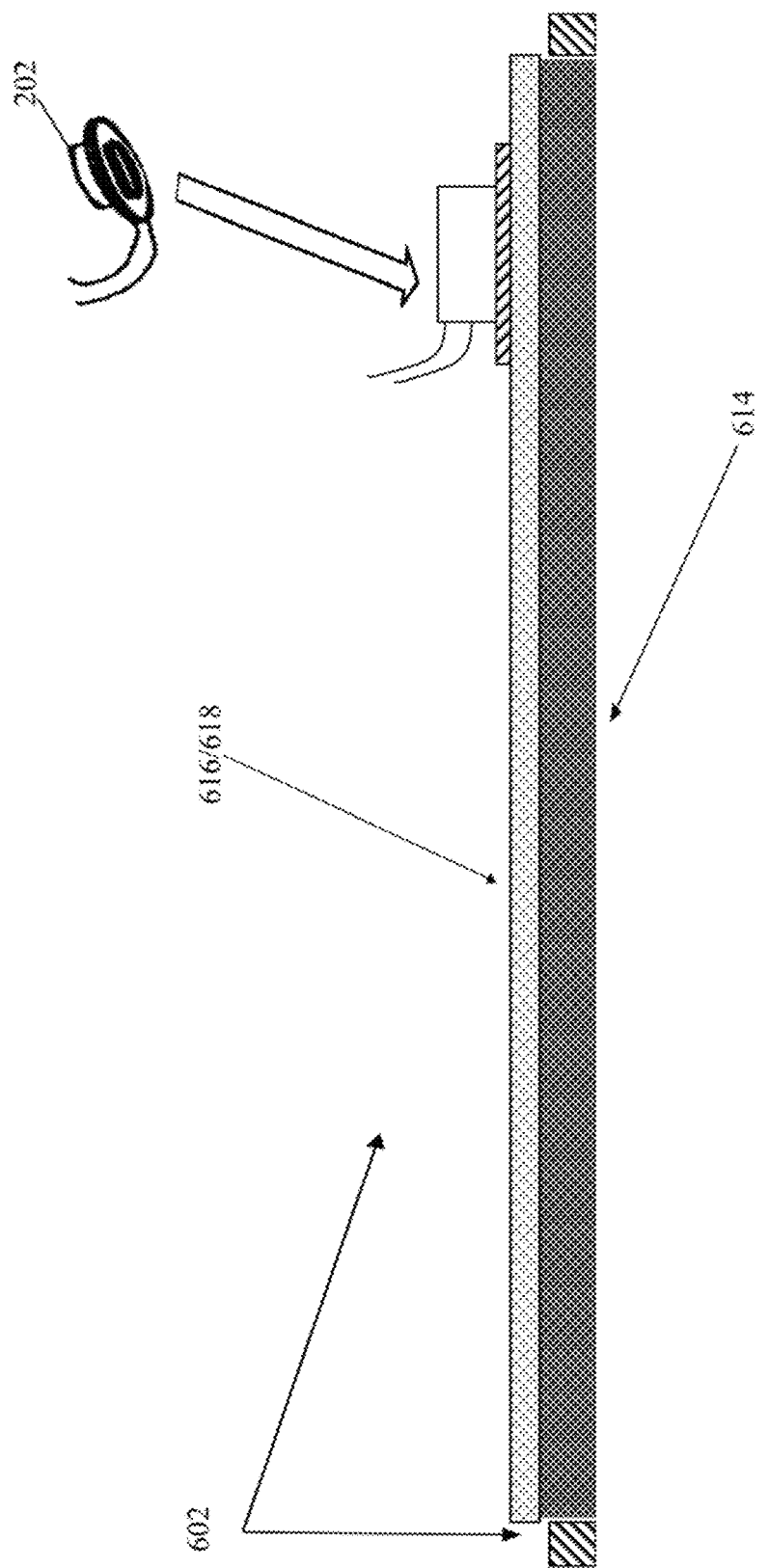

LUMINAIRE AND DUPLEX SOUND INTEGRATION

TECHNICAL FIELD

The present subject matter relates to techniques and equipment of a lighting system, and/or operations thereof, where the lighting system includes half-duplex or full-duplex circuitry and a sound transducer integrated on a surface of a housing element of a luminaire to form both an audio pickup and output device.

BACKGROUND

Electrical lighting has become commonplace in modern society. Electrical lighting devices are used commonly, for example, in homes, buildings of commercial and other enterprise establishments, as well as in various outdoor settings. Since the advent of light emitters, such as light emitting diodes (LEDs), for general lighting type illumination application, lighting equipment has become increasingly intelligent with incorporation of sensors, programmed controller and network communication capabilities. Typical luminaires generally have been a single purpose lighting device that includes a light source to provide artificial general illumination of a particular area or space.

Multiple lighting devices are often utilized to provide general illumination to a region, such as an entire floor of an office, commercial establishment, auditorium or classroom. Traditionally, such lighting devices are distributed in a pattern across the ceiling of the region under illumination to optimize lighting of the space for an intended use. In order to provide audio input, for example, via a microphone device, sound or other audio capabilities to the entire region having the multiple lighting devices, conventional microphones, or speakers are mounted individually to the ceiling and other surfaces within the region. Further, the conventional speakers and microphones require an aperture or other pathway for the acoustic wave to pass through.

A need exists for providing audio input and output capabilities, for example to an entire region having multiple lighting devices, that would reduce the clutter of ceiling mounted, wall mounted or stand alone conventional microphones and speakers, improve aesthetics, and save costs.

SUMMARY

The concepts disclosed herein alleviate the above noted problems with providing audio input and output capabilities in a lighting system.

A lighting device and system use a sound transducer integrated on a surface of an element of a luminaire to respond to vibrations of the luminaire element to detect incoming audio waves in the vicinity of the luminaire and to generate outgoing audio waves in the vicinity of the luminaire. Signals output from the sound transducer in response to detected audio waves may be supplied or processed in various ways in support of different applications or use cases for the audio capability of the lighting device and system. In the examples, the sound transducer integrated on the surface of the luminaire and the luminaire element provide both audio pickup as a microphone function, and audio output as a speaker function, that is to say, via the same sound transducer detects incoming sound waves and generates audio output through the sound transducer.

In an example, a lighting device may include a luminaire, a lighting control device, and duplex circuitry. The luminaire includes a light source, and a luminaire element comprising at least one of: an integral housing component of the luminaire, a reflector optically coupled to an output of the light source, or a diffuser optically coupled to an output of the light source. The luminaire also includes a sound transducer integrated on a surface of the luminaire element. The sound transducer is configured to respond to vibration of the luminaire element to detect incoming audio waves and output audible signals in the vicinity of the luminaire. Duplex circuitry is coupled to electrical terminals of the sound transducer. The duplex circuitry is configured to generate a first electrical signal of the incoming audio waves in the vicinity of the luminaire, and supply a second electrical signal to cause the sound transducer to generate the outgoing audio waves in the vicinity of the luminaire that are directly proportional to the second electrical signals.

In another example, a lighting device may include a luminaire, and duplex circuitry. The luminaire includes a light source, acoustic vibration means, and a two-way sound transducer. The two-way sound transducer is coupled to the acoustic vibration means. The duplex circuitry is coupled so as to cause the two-way sound transducer to detect incoming audio waves in the vicinity of the luminaire, and to generate outgoing audio waves in the vicinity of the luminaire, via the acoustic vibration means.

Additional advantages and novel features of the examples will be set forth in part in the description which follows, and in part will become apparent to those skilled in the art upon examination of the following and the accompanying drawings or may be learned by production or operation of the examples. The advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accordance with the present concepts, by way of example only, not by way of limitations. In the figures, like reference numerals refer to the same or similar elements.

FIGS. 6A, 6B, 6C, 6D, and 6E illustrate various cross-sectional views of example luminaires each having a single integrated sound transducer configured to provide half-duplex or full-duplex operations for both audio pickup and output functions in the lighting system of FIG. 1. FIG. 6A is a cross-sectional view of a single integrated sound transducer integrated on a housing element of the luminaire and configured to provide microphone and speaker functions in the lighting system of FIG. 1. FIG. 6B is cross-sectional view of an example luminaire having a single sound transducer integrated on a diffuser of the luminaire and configured to provide microphone and speaker functions. FIG. 6C is a cross-sectional view of an example luminaire having a single transducer t\integrated on a surface of a waveguide of the luminaire, and configured to provide both microphone and speaker functions. FIG. 6D is a cross-sectional view of an edge-lit luminaire having a single transducer integrated on a surface of a reflector or diffuser element of the luminaire, and configured to function as both a microphone and speaker. FIG. 6E is a cross-sectional view of an edge-lit luminaire integrated on a surface of a waveguide, and configured to provide both microphone and speaker functions.

DETAILED DESCRIPTION

Figure 1:
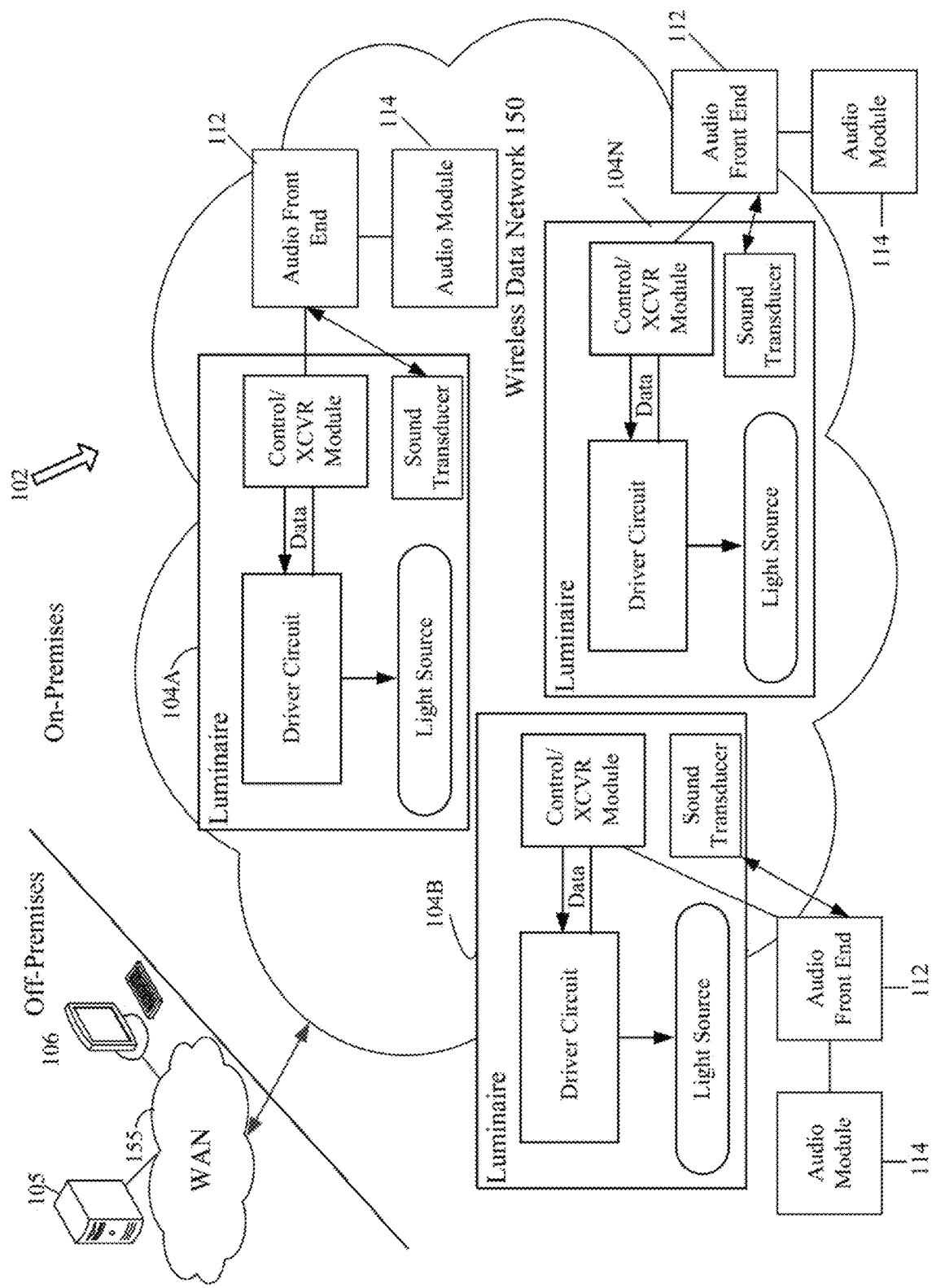
FIG. 1 is a functional block diagram of an example lighting system of networks and devices that provide a variety of lighting capabilities and include components configured to provide half-duplex or full-duplex communications with integration for both audio pickup and output functions.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to a lighting system including a luminaire having functionality of a light source to illuminate an area and a sound transducer integrated on an element (or means) of the luminaire, where the element (or means) is amenable to acoustic frequency vibrations or waves in a vicinity of the luminaire. The sound transducer is configured to respond to acoustic vibrations of the element (or means) to detect incoming audio waves in the vicinity of the luminaire, and to provide audio output as a speaker device based upon the vibrations of the element (or means) of the luminaire. The element in the different examples is a part of the luminaire that otherwise is provided for the purpose of structure or some lighting related function. Examples of such a luminaire element, on which the sound transducer may be integrated, include (but are not limited to) a panel or other integral housing component of the luminaire, a reflector optically coupled to an output of the light source, a diffuser optically coupled to an output of the light source, a waveguide coupled to an output of the sound transducer or light source, a refractor, a baffle or any other optical element having a rigid surface on which the sound transducer may be integrated.

The term "luminaire," as used herein, is intended to encompass essentially any type of device that processes energy to generate or supply artificial light, for example, for general illumination of a space intended for use of occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition to light provided for an organism. However, it is also possible that one or more luminaires in or on a particular premises have other lighting purposes, such as signage for an entrance or to indicate an exit. In most examples, the luminaire(s) illuminate a space or area of a premises to a level useful for a human in or passing through the space, e.g. general illumination of a room or corridor in a building or of an outdoor space such as a street, sidewalk, parking lot or performance venue. The actual source of illumination light in or supplying the light for a luminaire may be any type of artificial light emitting device, several examples of which are included in the discussions below.

Terms such as "artificial lighting," as used herein, are intended to encompass essentially any type of lighting that a device produces light by processing of electrical power to generate the light. An artificial lighting device, for example, may take the form of a lamp, light fixture, or other luminaire that incorporates a light source, where the light source by itself contains no intelligence or communication capability, such as one or more LEDs or the like, or a lamp (e.g. "regular light bulbs") of any suitable type. The illumination light output of an artificial illumination type luminaire, for example, may have an intensity and/or other characteristic(s) that satisfy an industry acceptable performance standard for a general lighting application.

In the examples below, the luminaire includes at least one or more components forming a light source for generating illumination light as well as a co-located sound transducer device, e.g., integrated/combined with the lighting component(s) of the light source into the one structure of the luminaire. The terms "sound transducer" or "exciter" as used herein, are intended to encompass essentially any type of device to convert energy or a signal from one form to another, i.e., energy, force, torque, light, motion, position, etc. For example, a microphone converts sound waves to electric pulses, an electric motor converts electricity into mechanical energy, or a speaker converts electrical energy into sound waves. The co-located sound transducer, in the examples below, is a two-way (input-output enabled) device coupled to a panel or the like of the luminaire to detect incoming audio waves in the vicinity of the luminaire, and supply or process the incoming audio signal to provide an output of audio waves in the vicinity of the luminaire.

In several illustrated examples, such a combinatorial luminaire may take the form of a light fixture, such as a pendant or drop light or a downlight, or wall wash light or the like. Other fixture mounting arrangements are possible. For example, at least some implementations of the luminaire may be surface mounted on or recess mounted in a wall, ceiling or floor. Orientation of luminaires and components thereof are shown in the drawings and described below by way of non-limiting examples only. The luminaire with lighting component(s) and the two-way sound transducer may take other forms, such as lamps (e.g. table or floor lamps or street lamps) or the like. Additional devices, such as fixed or controllable optical elements, may be included in the luminaire, e.g. to distribute light output from the illumination light source.

Terms such as "lighting system", "lighting device", or "lighting apparatus" as used herein, are intended to encompass essentially any combination of an example of a luminaire discussed herein with other elements such as electronics and/or support structure that are internal to and/or integral or external to the luminaire and arranged to operate and/or install the particular luminaire implementation. Such electronics hardware, for example, may include some or all of the appropriate driver(s) for the illumination light source, an audio front end device, and the sound transducer device, any associated control processor or alternative higher level control circuitry, and/or data communication interface(s). In an implementation, the lighting component(s) of the lighting system, device or apparatus, including, for example, the sound transducer, are physically co-located into an integral unit, such as a light fixture or lamp implementation of the luminaire. In another implementation, the electronics for driving and/or controlling the lighting component(s) and the sound transducer component may be incorporated within the luminaire or located physically separate from and coupled by appropriate means to the light source component(s).

In several of the examples, the lighting system, device or apparatus are software configurable, by programming instructions and/or setting data, e.g. which may be communicated to a processor of the lighting system via a data communication network of a lighting system. Configurable aspects of the two-way sound transducer operation may include one or more parameters (such as various sound related characteristics to be manipulated by signal processing) of an audio input or output via vibration of the housing element of the luminaire to detect incoming audio waves and/or generate outgoing audio waves, in the vicinity of the luminaire.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

Light output from the luminaire may carry information, such as a code (e.g. to identify the luminaire or its location) or downstream transmission of communication signaling and/or user data. The light-based data transmission may involve modulation or otherwise adjusting parameters (e.g. intensity, color characteristic or distribution) of the illumination light output from the device.

Detailed references to examples illustrated in the accompanying drawings and discussed below are provided. Although specific examples are provided for lighting or illumination of an area, the sound transducer integrated on the luminaire and disclosed features herein are not limited to control of light sources in the lighting systems, and may be adapted to provide sound integration for both audio user inputs and audible outputs for users for applications that may or may not directly relate to lighting system operation.

Reference now is made in detail to the examples illustrated in the accompanying drawings and discussed below. FIG. 1 is a functional block diagram of an example lighting system of networks and devices that provide a variety of lighting capabilities and include components configured to provide half-duplex or full-duplex communications with integrated audio pickup and output functionalities.

In FIG. 1, a lighting system 102 using, for example, a wireless data network 150 and devices that provide a variety of lighting capabilities, includes communication in support of lighting functions such as turning lights on/off, dimming, and utilizes a luminaire 104A-104N, for example, integrated with a two-way sound transducer configured to respond to vibration of a housing element of the luminaire to detect incoming audio waves and generate outgoing audio waves in a vicinity of the lighting system 102, where the housing element is a rigid structural portion of the housing for the luminaire that may have multiple configurations. The lighting system 102 further includes a lighting control device, which should be understood to encompass a device that includes a controller (e.g. a Control XCVR module or microprocessor unit) that executes a lighting application for communication, in the example, over a wireless lighting network communication band, of control and systems operations information during control network operations over the lighting network communication band and during associated detection and processing of incoming audio waves in a vicinity of the luminaire 104A-104N. Alternatively, although the lighting system 102 is illustrated as communicating to/from the wireless data network 150, the system 102 may use wired communication via wired links or optical fibers and a local area network (LAN) or the like.

A lighting system 102 may be designed for indoor commercial spaces, although the system may be used in outdoor or residential settings. As illustrated in FIG. 1, system 102 includes a variety of lighting control devices, such as a set of lighting devices (a.k.a. luminaires or light fixtures) 104A-104N. The luminaires 104A-104N include sound transducers integrated on a surface of a panel element of the luminaire 104A-104N that is susceptible to acoustic waves in a vicinity of the luminaire 104A-104N in the lighting system 102. The housing element may be a housing panel, a reflector, a diffuser or the like. Examples of the sound transducer integrated on the surface of the panel of the luminaire 104A-104N are described and illustrated in further detail below.

At a high level, audio input or audio wave detection and audio output via a sound transducer may be used to control operation of the luminaire that includes the sound transducer, to control operation of that luminaire and some number of other luminaires, to control other equipment, or provide feedback accessible to or within the system 102. For example, such audio input and audio wave detection and audio feedback, via the sound transducer, may be used to detect and send messages or feedback about sonic events like gunshots or glass breakage, for digital audio recording, voice assistance for lighting or building management control, audio-based positioning with one or more luminaires integrated with a sound transducer to provide both audio pick up and playback as for an alarm system or search and rescue, integration with a telephone system, e.g., conference calls, enhanced person-to-person voice communication in a large room, geologic, physiologic or weather event monitoring, e.g., wind, earthquake, equipment vibrations, or process white noise with subtle variation in noise to provide navigational cues to the visually impaired.

The example wireless data network 150 may use any available standard wireless data communication technology, such as cellular, WiFi, Bluetooth, ZigBee, LiFi, etc. LiFi is a form of visible light communication and a subset of optical wireless communication (OWC), and uses light from light-emitting diodes (LEDs) as a medium to deliver networked, mobile, high-speed communication in a similar manner to WiFi with the exception that WiFi utilizes radio waves, while LiFi uses light. Alternatively, the wireless data network may use a proprietary protocol and/or operate in an available unregulated frequency band, such as the protocol implemented in nLight® Air products, which transport lighting control messages on the 900 MHz band (an example of which is disclosed in U.S. Pat. No. 9,883,570 to Turvy, entitled "Protocol for Lighting Control Via a Wireless Network," the entire contents of which are incorporated herein by reference). The system may support a number of different lighting control protocols, for example, for installations in which consumer selected luminaires of different types are configured for a number of different lighting control protocols. Further, the devices of the lighting system 102 are not limited by the nLight® network, and may be configured to communicate using another backbone network architecture and protocol known in the art, for example, 0-10 v, Digital Addressable Lighting (DALI), BACnet, digital multiplex (DMX), RDX, Phase-Cut, etc. Communications may use any suitable wired or wireless media.

Cat5 type cabling may be used between the devices for the wired communication via a local area network (LAN, e.g., Intranet). The cable type example of the data network may use any available standard data communication technology, such as Ethernet, RS485, PLC, or the like.

Communications may also occur between the lighting system 102 and a server 105 through a network such as wide area network (WAN, e.g., Internet) 155. The WAN 155 outside/off premises, may be an intranet or the Internet, for example. Although FIG. 1 depicts server 105 as located off premises and accessible via the WAN 155, any one of the luminaires 104A-104N, for example is configured to communicate results related to detection or processing of incoming audio waves in the vicinity of the lighting system 102 to and provide audible output to devices such as the server 105 or even, for example, a laptop 106 located off premises.

The on-premises in FIG. 1 may be any location or locations serviced for lighting and other purposes by a networked intelligent system of the type described herein. The luminaires 104A-104N are located to provide lighting service in various areas in or about the premises. Most of the examples discussed below focus on building installations, for convenience, although the system may be readily adapted to outdoor lighting. Hence, lighting system 102 provides lighting, and other services, such as building management system (BMS) control, for example, for building access and security systems, audio systems, thermostat control in heating, ventilation and air conditioning (HVAC), humidifiers, water flow/control, or any combination of connected Internet of Things (IoT) devices or home appliances, in a number of service areas in or associated with a building, such as various room, hallways, corridors or storage areas of a building and an outdoor areas associated with the building.

Figure 2:
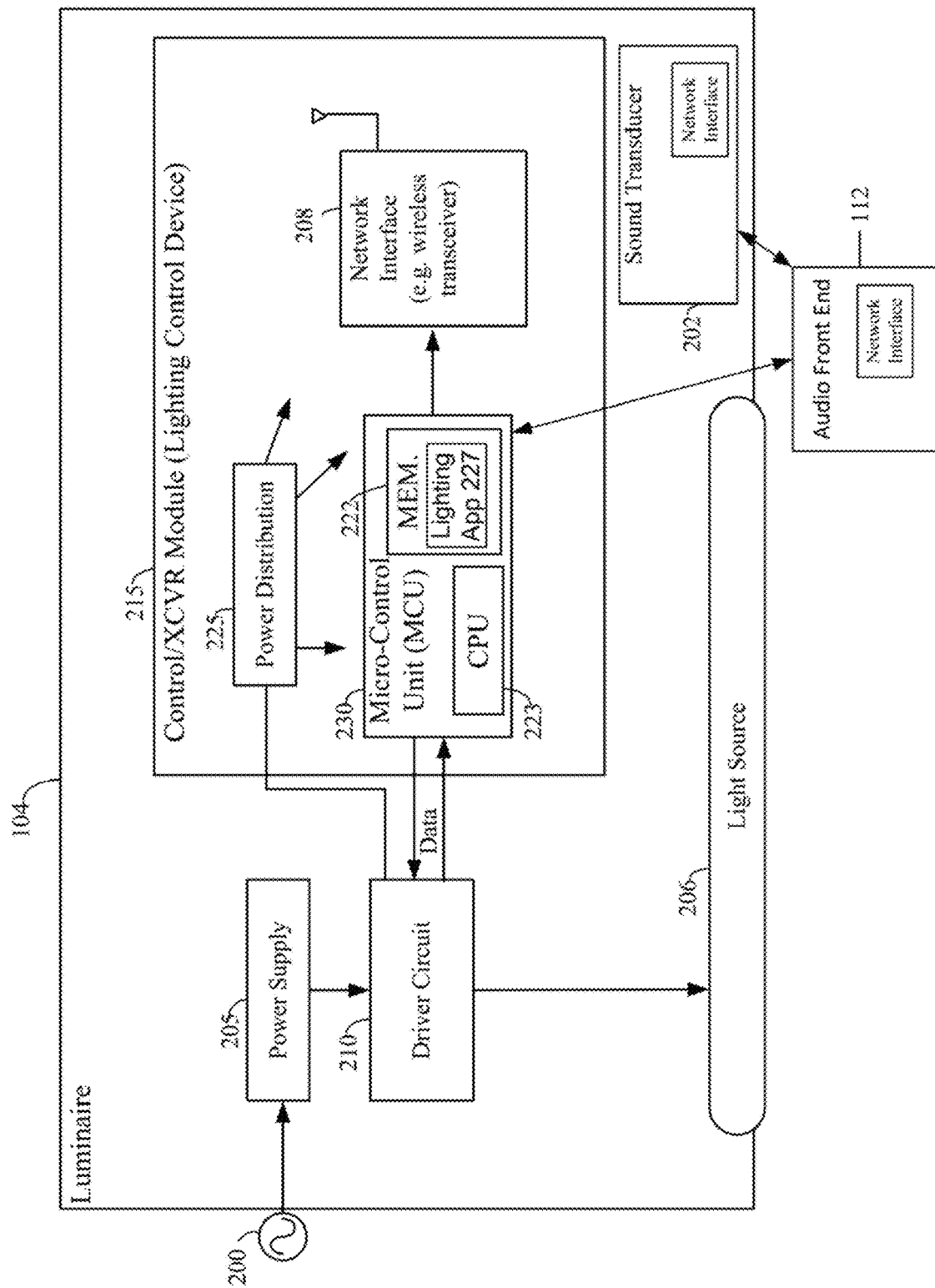
FIG. 2 is a block diagram of an example luminaire that operates in and communicates via the lighting system of FIG. 1.

FIG. 2 is a block diagram of an example luminaire that operates in and communicates via the lighting system of FIG. 1. Luminaire 104 is an integrated lighting device that generally includes a power supply 205 driven by a power source 200. Power supply 205 receives power from the power source 200, such as an AC main, battery, solar panel, or any other AC or DC source. Power supply 205 may include a magnetic transformer, electronic transformer, switching converter, rectifier, or any other similar type of circuity to convert an input power signal into a power signal suitable for luminaire 104.

Luminaire 104 further includes a driver circuit 210, for example an intelligent LED driver circuit, control/XCVR module 215, and a light source 206. In another implementation, the light source may not be intelligent and thus would not require a driver circuit. Light source 206 can be a single or multiple variable light intensity and/or colors. Also, the light source 206 can be a light emitting diode (LED), organic light emitting diode (OLED), electroluminescent, or other appropriate light source for the area to be illuminated. In most examples, the luminaire 104 illuminates a service area to a level useful for a human in or passing through the space, e.g. regular illumination of a room or corridor in a building such as a store, and/or provide an indoor visible light source based positioning system. For purposes of example, the light source 206 may be a LED-type light, however, the light source 206 may be virtually any type of light source suitable to providing the intended type of light output that may be electronically controlled. Further, the light source 206 may be of the same general type in each of the luminaires 104A-104N, e.g. all formed by some number of light emitting diodes (LEDs), although in many installations, some number of luminaires 104A-104N may have different types of light sources 206, e.g. some use LEDs, some use compact or tube type fluorescent sources, etc. Additionally, daylight or ambient light sensors, motion sensors, proximity sensors, occupancy and vacancy sensors, audio, temperature, infrared sensors, ultrasonic sensors or other environmental sensors and the like may be embedded in the luminaires to further enhance the detection and processing of audio input or audio waves in the vicinity of the luminaire.

The driver circuit 210 is coupled to light source 206, which as indicated above may be an LED light source, and drives the light source 206 by regulating the power to the light source 206 to provide a constant quantity or power to light source 206 as its electrical properties change with temperature, for example. Driver circuit 210 may be a constant-voltage driver, constant-current driver, or AC driver type circuit that provides dimming through a pulse width modulation circuit, and may have many channels for separate control of different LEDs or LED arrays that could make up the light source 206. An example of a commercially available intelligent driver circuit 210 is manufactured by EldoLED.

Driver circuit 210 can further include an AC or DC current source or voltage source, a regulator, an amplifier (such as a linear amplifier or switching amplifier), a buck, boost, or buck/boost converter, or any other similar type of circuit or component. Driver circuit 210 outputs a variable voltage or current to the light source 206 that may include a DC offset, such that an average value is nonzero, and/or an AC voltage.

Control/XCVR module 215 includes power distribution circuitry 225 and a micro-control unit (MCU) 230. As illustrated in FIG. 2, MCU 230 is coupled to the driver circuit 210 and controls the light source operation of the light sources 206. Control/XCVR module 215 is also coupled to audio front end device 112 and controls the audio front end device 112 to supply or process the incoming audio signals detected by the sound transducer 202. MCU 230 includes a memory 222 (volatile and non-volatile) and a central processing unit (CPU) 223 that are coupled by a network interface 208. The CPU 223 is also coupled to communicate via the network interface 208 and the network link with one or more others of the luminaires or devices of the system of FIG. 1. The network interface for each of the devices, for example, the lighting control device 215, audio front end device 112, and audio module 114 may be a wireless transceiver. The MCU 230 and the CPU 223 may be implemented via hardwired logic circuitry, but in the examples, the processor is a programmable processor such as a central processing unit (CPU) 223 of a microcontroller or microprocessor. The memory 222 stores programming for execution by the CPU 223 of the micro-control unit 230 and data that is available to be processed or has been processed by the CPU 223. The memory for example, may include a lighting application 227 (which can be firmware) for both detecting incoming audio input or audio waves and lighting control operations. The processors and memories in the luminaires may be substantially the same throughout the devices 104A-104N on-premises, or different luminaires 104A-104N may have different processor 223 and/or different amounts of memory 222, depending on differences in intended or expected processing needs. The power distribution circuitry 225 distributes power and ground voltages to the MCU 230 and wireless transceiver 208 to provide reliable operation of the various circuitry on the Control/XCVR module 215.

The network interface 208 in each luminaire 104 in a particular service area will be of a physical type and configured to operate in a manner that is compatible with the physical media and electrical protocol(s) implemented for the particular service area and/or throughout the premises of the system. Although FIG. 2 shows the luminaire 104 having one network interface 208, some or all of the luminaires 104 may have two or more network interfaces 208 to enable data communication over different media with the network(s) and/or with other devices in the vicinity.

Luminaire 104 further includes a two-way sound transducer 202. The sound transducer 202 may be internally or externally integrated, via an adhesive or mechanical attachment, on a surface of an element (or means) of the luminaire such that the sound transducer 202 responds to vibrations of the luminaire element to detect incoming audio waves and generate outgoing audio waves in a vicinity of the luminaire. The sound transducer 202 is configured to communicate with the control/XCVR 215 via the audio front end device 112, the network interface 208 and the data network 150.

In the examples, the control/XCVR module 215, sound transducer 202 and the network interface 208 are shown as integrated with other components of the luminaire 104, or attached to the luminaire 104 or other components that incorporate the light source 206. However, for some implementations, the light source 206 may be attached in such a way that there is some separation between the luminaire or another component that incorporates the electronic components that provide the intelligence and communication or audio capabilities. For example, the communication components and possibly the CPU 223 and memory 222 may be elements of a separate device or component coupled and/or co-located with the luminaire 104. Additionally, an audio front end device 112 and an audio module 114 (each described below) may be coupled internally or externally to components of the luminaire 104.

Figure 3B:
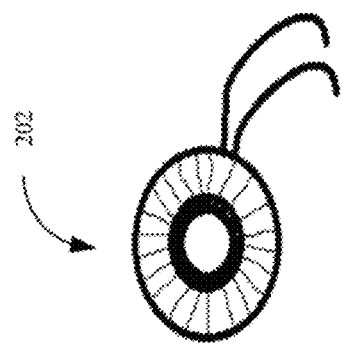
FIG. 3B is a bottom view of the example sound transducer that operates in the lighting system of FIG. 1.
Figure 3A:
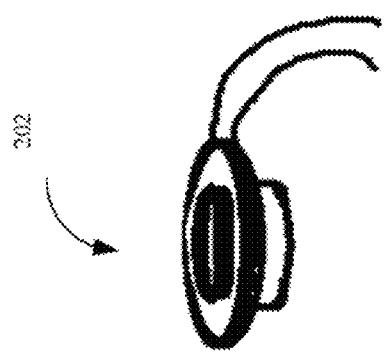
FIG. 3A is profile view of an example sound transducer that operates in the lighting system of FIG. 1.

FIG. 3A is a profile view of an example two-way sound transducer that operates in the lighting system of FIG. 1. FIG. 3B is a bottom view of the example sound transducer that operates in the lighting system of FIG. 1.

As illustrated in FIG. 3A, sound transducer 202, having two leads, is a device configured to detect acoustic or sound waves and vibrations in a typical human audible range of 20 Hz-20 KHz, and generate outgoing audio waves in the vicinity of the luminaire. Acoustic or sound waves may be detected in a range having reduced sound quality, for example, 150 Hz-3500 Hz, from very low frequencies, for example, sub-sonic range of 1 Hz-20 Hz, up to very high frequencies, for example, an ultra sonic range of 20 KHz-80 KHz or a broader ultra-sonic range of 20 KHz-200 KHz. The vibrations from the detected sound waves are converted to corresponding frequency electrical signals. Sound transducer 202 includes at least two leads that directly contact the surface of an element (or means) of the luminaire 104. The luminaire element, for example, a housing panel, is susceptible to the acoustic waves in a vicinity of the luminaire. When the sound transducer 202 is attached to the luminaire 104, incoming acoustic or sound waves vibrate the housing panel, similar to a diaphragm, as the waves reach the surface of the housing panel. When the vibrations on the surface of the housing panel are detected, the sound transducer outputs electrical signals, via for example, the at least two leads of the sound transducer 202, in the form of an analog output signal of the detected audio waves. The analog output signal has a voltage or current that is proportional to the incoming acoustic waves acting upon the housing panel/diaphragm of the luminaire 104. FIG. 3B illustrates a bottom view of the sound transducer 202 which may be adhesively or mechanically attached to the surface of the luminaire element.

Figure 4B:
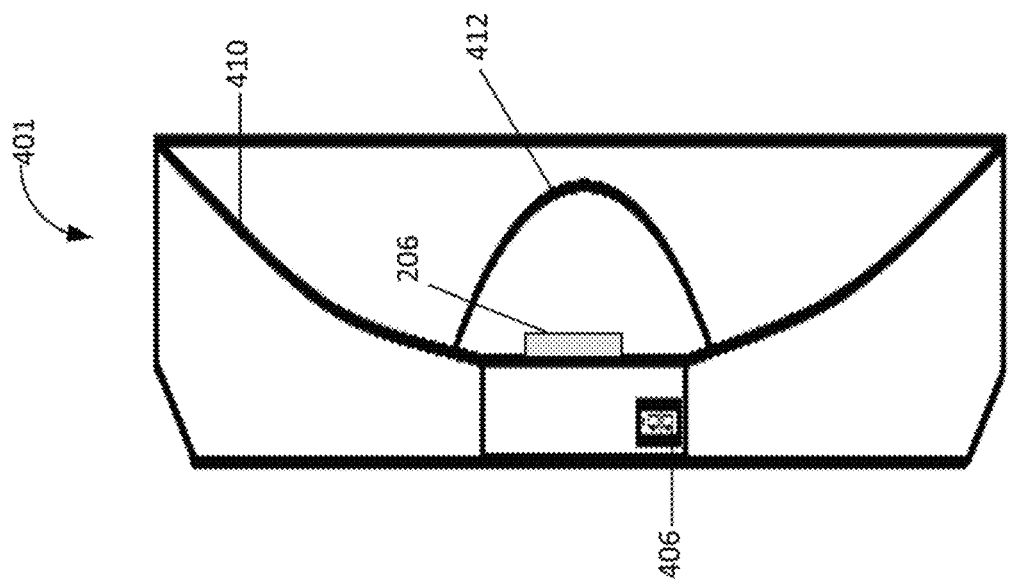
FIG. 4B is a cross-sectional view of an example luminaire that operates in the lighting system of FIG. 1.
Figure 4A:
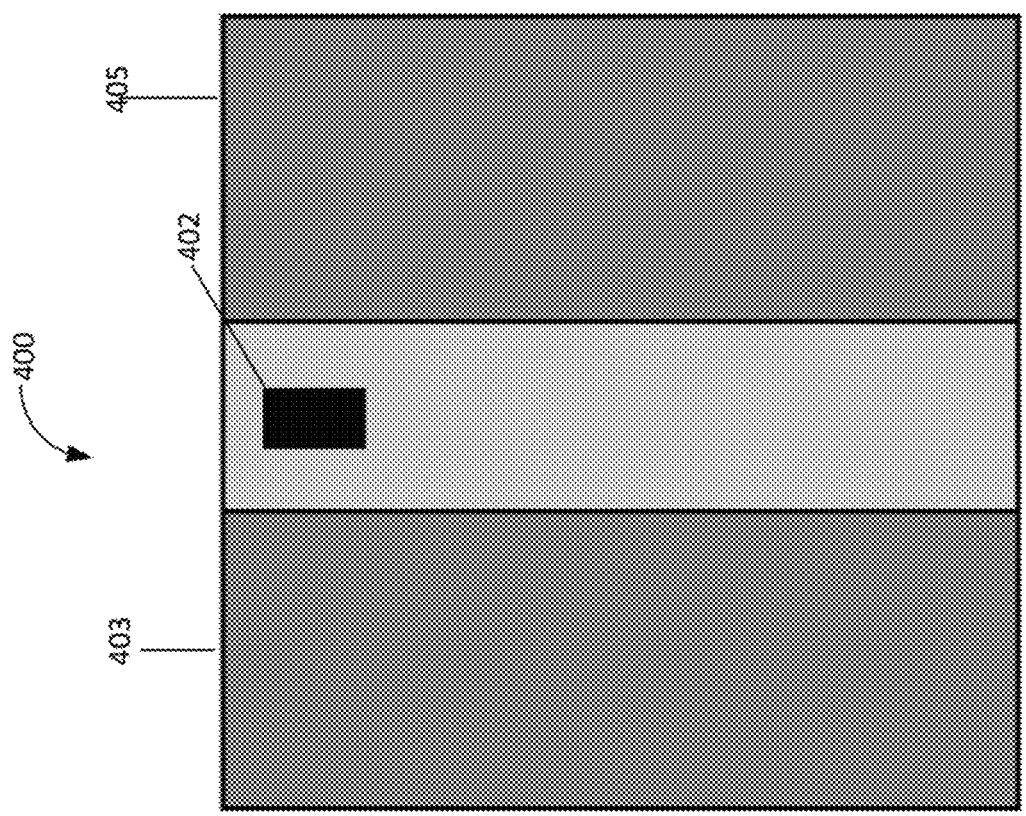
FIG. 4A is a top view of an example luminaire that operates in the lighting system of FIG. 1.

FIG. 4A is a top view of an example luminaire that operates in the lighting system of FIG. 1. As illustrated in FIG. 4A, the top surface 400 of the luminaire includes, for example, two rigid elements (or means) having a flat or curved surface and that may be housing panels (403/405), a reflector (illustrated below) which would be a reflective front surface or surface opposite the top view of the luminaire and that is exposed to an area for illumination or a user, a diffuser (illustrated below), a waveguide, refractor, or any other optical element having a rigid surface on which the transducer may be attached. A wiring port 402 provides access to wiring and power connections for the luminaire. FIG. 4B is a cross-section view of the example luminaire that operates in the lighting system of FIG. 1. As illustrated in FIG. 4B, a cross-sectional view of the luminaire 401 includes, light source 206, a reflector 410, a diffuser 412 optically coupled to the output of the light source 206 and at least partially enclosing the light source 206, and for wired communications, an access area 406 for connectors such as RJ45 connectors.

Figure 5:
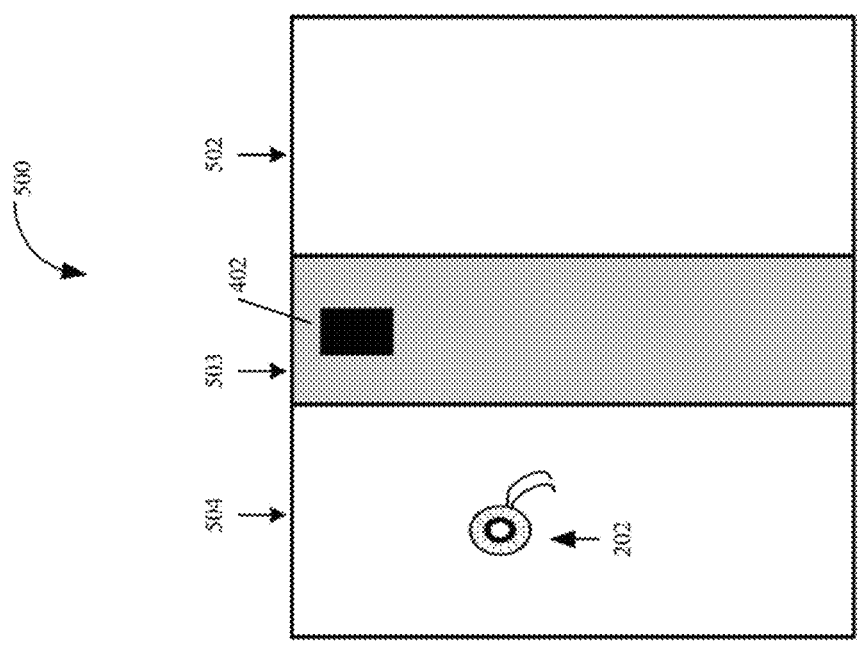
FIG. 5 is a top view of an example luminaire having a sound transducer integrated on a housing element of the luminaire and providing half-duplex or full-duplex operations for audio pickup and output functions in the lighting system of FIG. 1.

FIG. 5 is a top view of an example luminaire 500 having a two-way sound transducer integrated on an element of the luminaire, and that operates to provide half-duplex or full-duplex operations for both audio pickup and audio output functions in the lighting system of FIG. 1. In FIG. 5, the example luminaire 500 includes two housing panels 502/504, that are configured to be susceptible to acoustic waves in a vicinity of the luminaire 500. The luminaire elements may be rigid, and flat or curved, for example, a housing panel or other integral housing component, a reflector, a diffuser, a waveguide or the like. In another example, the housing element may be a diffuser that may be located in an area 503 on the side opposite the top view of FIG. 5. The diffuser (not illustrated in FIG. 5) is optically coupled to an output of a light source (not illustrated) or as an integral component of a housing element of the luminaire that at least partially encloses the light source. The number of luminaire elements is not limited to the illustrated luminaire elements of this specification, and may include, any number of luminaire elements, for example housing panels as shown in FIG. 5. The luminaire 500 of FIG. 5 further includes the two-way sound transducer 202. As illustrated, sound transducer 202 is attached, for example, to housing panel 504, and is configured to provide both audio pick-up (microphone) and audio output (speaker) functions in the lighting system. The location for integration of the sound transducer 202 on the luminaire is based on the design requirements or the installer's preference with respect to which luminaire element is selected, and the physical location or orientation of the sound transducer 202 on the luminaire element.

In another implementation, multiple transducers may be integrated on different luminaire elements such that each sound transducer can provide both audio pick-up and audio output functions.

Figure 6A:
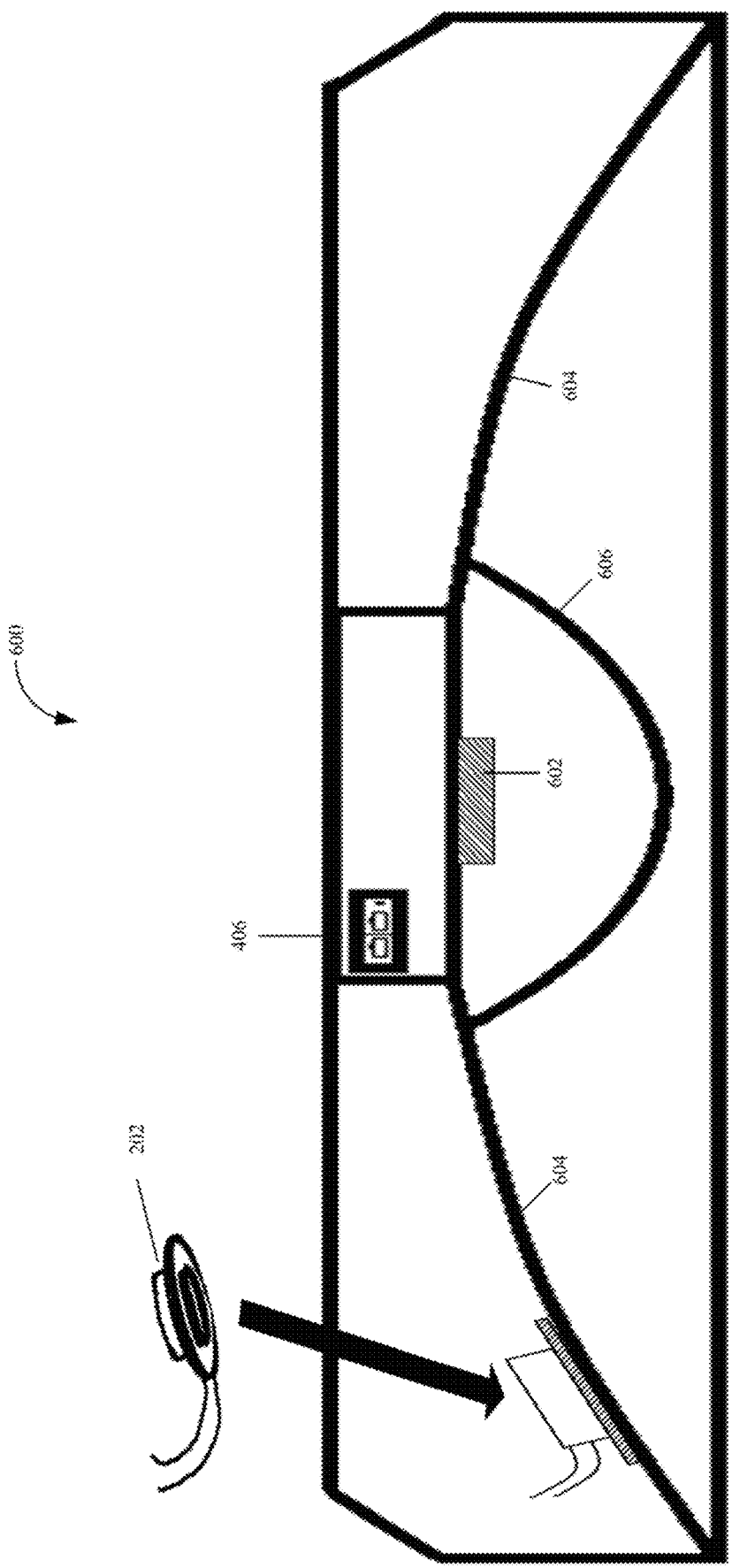

FIGS. 6A, 6B, 6C, 6D, and 6E illustrate various cross-sectional views of example luminaires having a single integrated sound transducer configured to provide half-duplex or full-duplex operations for both audio pickup and audio output functions in the lighting system of FIG. 1. FIG. 6A is a cross-sectional view of a single integrated sound transducer integrated on an element (or means) of the luminaire and configured to provide microphone and speaker functions in the lighting system of FIG. 1. The luminaire 600 in the example of FIG. 6A includes, a light source 602 optically coupled to a diffuser 606, an access area 406 for connectors, such as RJ45 connectors, reflectors 604, and a sound transducer 202 integrated on a surface of a housing panel such that the sound transducer 202 attached on the housing panel of the luminaire forms both an audio pickup and audio output device to provide, for example, audio pickup or a microphone function, as well as audio output or a speaker function in the lighting system. The luminaire elements may also include a diffuser or reflector on which the sound transducer 202 is attached, via a mechanical or adhesive connection, to form the dual audio pickup and audio output device. As illustrated in FIG. 6A and further described below, the elements (or means) of the luminaire may also include a diffuser 606 or reflector 604 on which the sound transducer 202 is attached to form the audio pickup and audio output device.

Figure 6B:
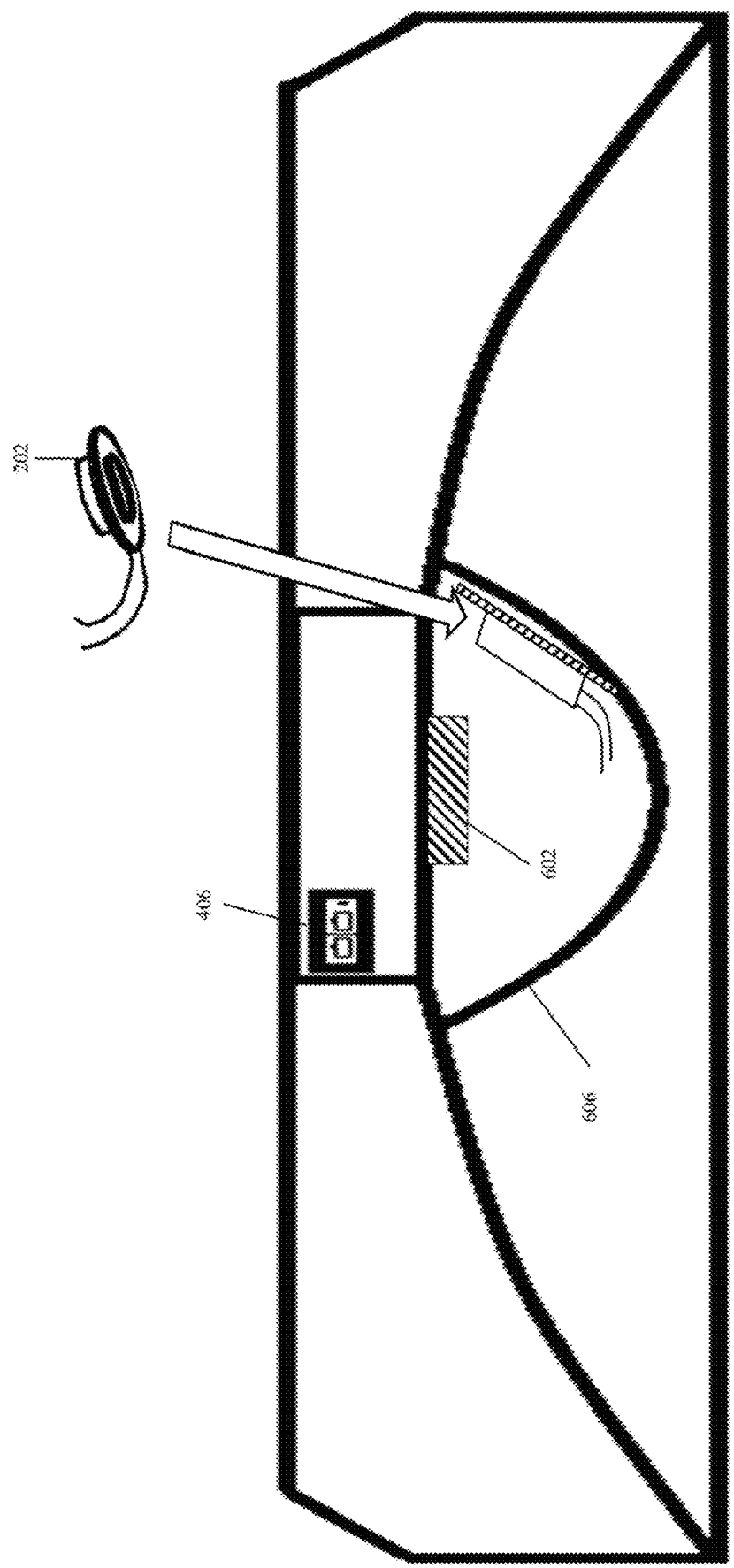

FIG. 6B is cross-sectional view of an example luminaire having a single sound transducer integrated on a surface of an element (or means) of the luminaire, and configured to provide microphone and speaker functions. In FIG. 6B, the luminaire includes a light source 602, a diffuser 606 optically coupled to the light source 602, and access area 406 for connectors, such as RJ45 connectors, and a two-way sound transducer 202 integrated on a surface of the diffuser 606. In FIG. 6B, the diffuser 606 effectively forms a wall or cover around the light source 602; but other types or designs for the diffuser may be used.

Figure 6C:
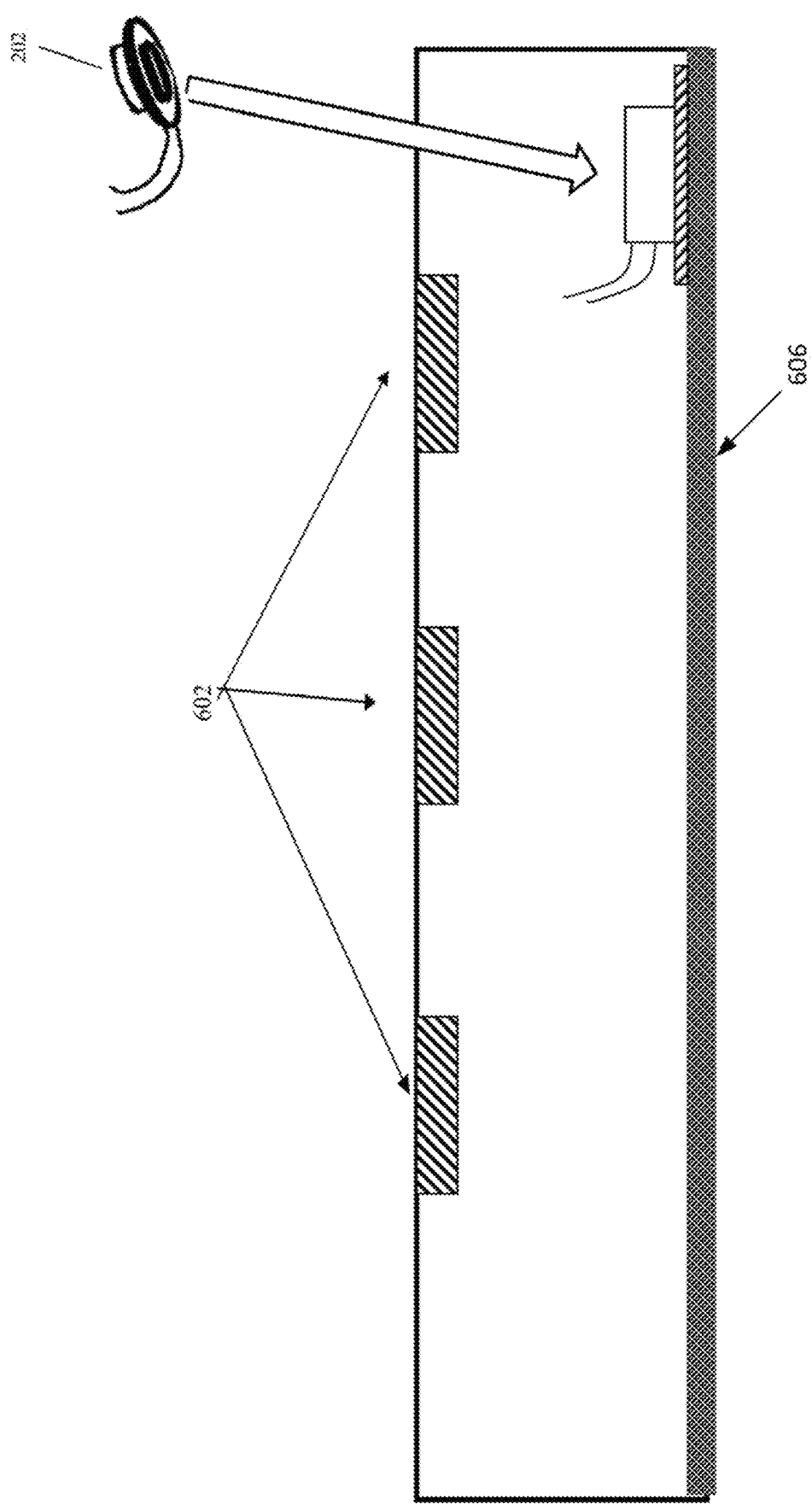

FIG. 6C is a cross-sectional view of an example luminaire having a single transducer integrated on a surface of element such as a waveguide of the luminaire, and configured to provide both microphone and speaker functions. In FIG. 6C, the luminaire includes a plurality of light sources 602, and a diffuser 606, refractor 606 or other similar optical element. A two-way sound transducer 202 is integrated on a surface of the diffuser 606, and configured to provide both audio pickup and audio output functions in the area of the luminaire.

FIG. 6D is a cross-sectional view of an example edge-lit luminaire having a single transducer integrated on a surface of an element (or means) of the luminaire that is amenable to acoustic frequency vibrations generated by the sound transducer or by incoming audio waves. The element (or means) is a part of the luminaire that otherwise is provided for purposes of structure or some lighting related function. Examples of such a luminaire element, on which the sound transducer or two-way sound transducer may be integrated, include (but are not limited to) a panel or other integral housing component of the luminaire, a reflector optically coupled to an output of the light source, a diffuser optically coupled to an output of the light source, and a waveguide, for example, a light waveguide, coupled to an output of the light source. In the implementation of FIG. 6D, the luminaire element may be a reflector 616 or a diffuser 618. Light sources 602 are located on respective ends or edges of, for example, a linear suspended edge-lit luminaire. In another implementation, the edge-lit luminaire may not include a reflector 616 or diffuser 618, in which case, the two-way sound transducer 202 may be integrated on the surface of another rigid element of the luminaire such as, for example, a waveguide 614. The sound transducer 202, integrated on the surface of the reflector 616, diffuser 618, or the waveguide 614, is configured to provide both audio pickup (microphone) and audio output (speaker) functions in an area of the edge-lit luminaire.

Figure 6E:
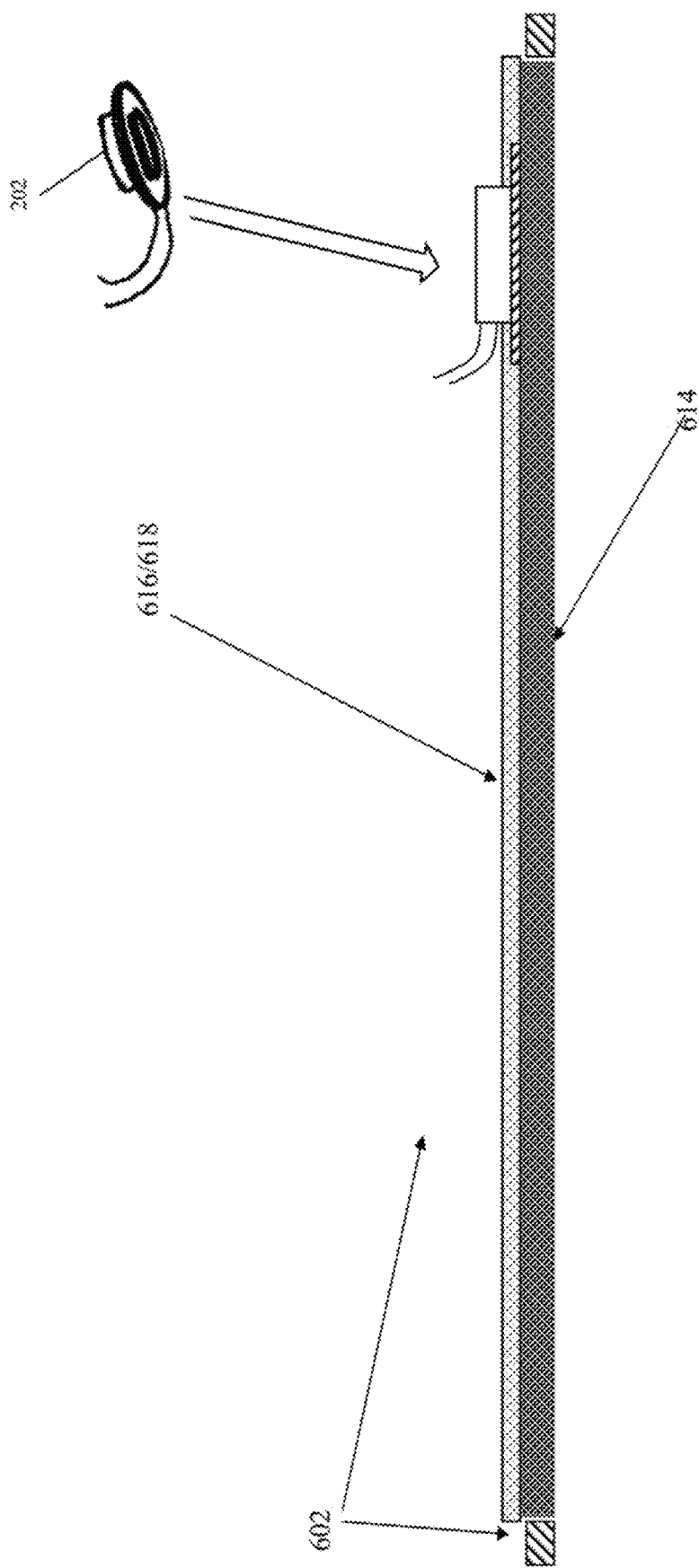

FIG. 6E is a cross-sectional view of an example edge-lit luminaire having a single transducer integrated on a surface of an element of the luminaire. As illustrated in FIG. 6E, the luminaire element is a waveguide 614. The edge-lit luminaire may further include luminaire elements such as a reflector 616 and diffuser 618. Light sources 602 are located on respective edges or ends of, for example, a linear suspended edge-lit luminaire. The two-way sound transducer 202 is integrated on a surface of the waveguide 614, and configured to provide both microphone and speaker functions in the area of the edge-lit luminaire. In another implementation, optical cladding may be arranged between the bottom surface of the sound transducer 602 and the waveguide 614 to ensure proper operation of the waveguide 614.

Figure 7:
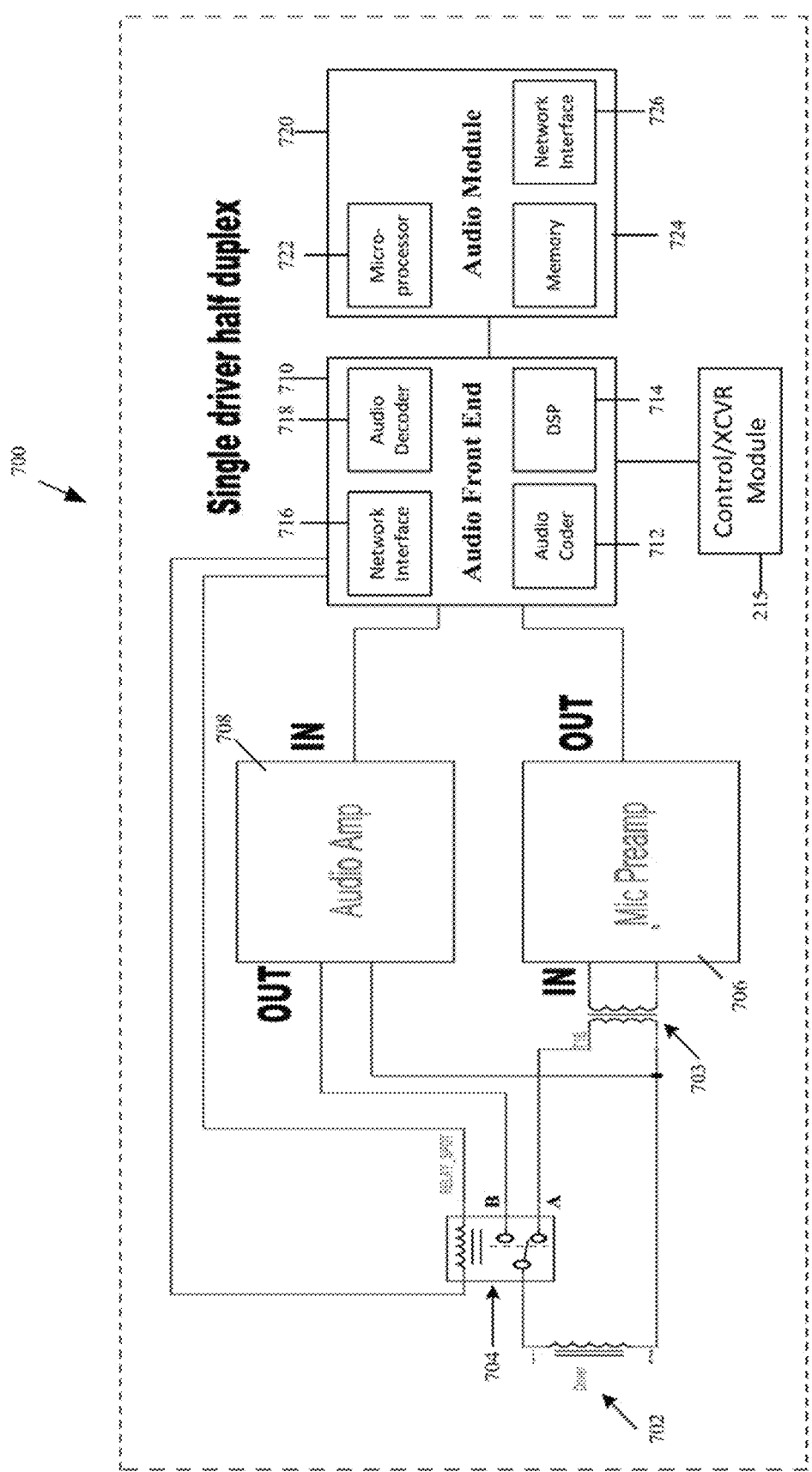
FIG. 7 illustrates example devices and circuitry for a more detailed explanation of a luminaire having half duplex circuitry and a sound transducer integrated on the luminaire that is driven to provide half-duplex operations for both audio pickup and output functions in the lighting system of FIG. 1.

FIG. 7 illustrates example devices and circuitry for a more detailed explanation of a luminaire having half duplex circuitry and a two-way sound transducer integrated thereon driven to provide audio pickup and output functions in the lighting system of FIG. 1. Additional components of the luminaire such as the power supply, driver circuit and light source are a part of the luminaire 700, and are described above. For ease of explanation, the description and illustration of these components are not repeated here.

As show in FIG. 7, the luminaire 700 includes the two-way sound transducer 702 integrated on a surface of the luminaire 700. As discussed above, the sound transducer 702 is configured to respond to an acoustic vibration of an element of the luminaire. The vibrations on the luminaire element, for example housing panels, of the luminaire result in acoustic waves that act upon the diaphragm created by the sound transducer contacting the surface of the luminaire element. The sound transducer 702 also is configured to vibrate the housing element of the luminaire to generate output acoustic waves in the vicinity of the luminaire, in response to electrical signals applied to the sound transducer 702 from higher layer circuitry of the lighting device. In this first circuit example, the connections to the leads to the sound transducer 702 are switched to effectively switch the input-output direction and thus switch the sound transducer operation between its two directions of acoustic operation (between detecting vibrations and generating vibrations). In an implementation, a default setting of the switch 704 is an A position in which the sound transducer provides an audio pickup function. In the A position, the sound transducer functions as an audio pickup device to detect incoming audio waves in the area of the luminaire, for example, detected by sensors arranged in the area. The single two way sound transducer, in the half duplex circuitry implementation of FIG. 7, further provides an audio output function when switched to an audio output or playback position. In the half-duplex implementation of FIG. 7, the switch is in one of the A or B position, i.e., the audio pickup and audio output functions do not occur at the same time, as described below.

The position of relay switch 704 controls a function of the half duplex circuitry including the transducer 702 and two amplifiers 706 and 708 to determine when the sound transducer 702 provides audio pickup such as with a microphone via amplifier 706, or audio output such as with an audio speaker responsive to electrical signals from amplifier 708. Because the duplex circuitry is half duplex, the sound transducer does not provide simultaneous audio pickup and audio output functions. As illustrated, the sound transducer 702 has two leads to provide physical and electrical connection to other circuitry of the luminaire 700. One of the leads 2 of the sound transducer 702 is connected both to an electrical component of the luminaire 700, such as a transformer 703 for input to the amplifier 706 and to an output terminal of the amplifier 708. The other lead of the sound transducer 702 is connected to a terminal of the relay switch 704. Terminal A of the switch 704 connects to the transformer 703 coupled to amplifier 706, and terminal B of the switch 704 connects to the other output terminal of the audio amplifier 708.

When the relay switch 704 is in a first position to connect terminal A to the lead 1 of the transducer 702, the audio pickup or microphone function of the circuit is closed and the connection of the transducer 702 to the winding of transformer 703 is complete. In the audio pickup portion of the circuit, the sound transducer 702 "receives" or detects incoming sound waves in an area of the luminaire 700 and transformed and amplified audio frequency electrical signals are output via amplifier 706. The connection of the transducer 702 to the amplifier 708 is incomplete.

Alternatively, when the relay switch 704 is in a second position to connect terminal B to the lead 1 of the transducer 702, the audio output portion or speaker function of the circuit is closed, and connection of the transducer 702 to the output from the audio amplifier 708 is complete. In the audio output portion or speaker portion of the circuit, the sound transducer 702 receives amplified audio frequency electrical signals from the amplifier 708, produces responsive acoustic vibrations of the housing element of the luminaire, and thereby produces audio output waves in the area of the luminaire 700.

When the relay switch 704 is in the A-position, detected incoming acoustic waves received at the sound transducer 702 are converted to electrical signals. In particular, the incoming sound waves are converted, via a connection and flow of current through the winding of the transformer 703, to audio frequency electrical signals. The electrical signals output from the transformer 703 are input to amplifier 706 that amplifies the audio-frequency of electrical signals output by sound transducer 702 via the transformer 703. The amplified signals are analog signals representing the detected incoming audio signals. The amplified signals from the amplifier 706 are supplied to the audio front end device 710. In the example illustrated in FIG. 7, the amplifier 706 is located outside the audio front end device 710. In another example, the amplifier 706 is located in the audio front end device 710.

In an implementation, the audio front end device 710 receives amplified analog audio signals from the amplifier 706. The amplified analog signals represent the detected incoming audio waves in the vicinity of the luminaire 104 as discussed above with respect to FIG. 1. The audio front end device 710 includes an audio coder 712 that converts the audio signals from the amplifier 706 to digital signals. Because the audio output/speaker function and audio pickup/microphone functions are acoustically coupled through the housing of the luminaire, the sound transducer functioning as a microphone can easily detect or pick-up output when functioning for audio output/speaker or other audio output in the area of the luminaire. Therefore, extraneous audio or sounds need to be subtracted from the microphone input. This is the context for signal processing in the system. A digital signal processor (DSP) 714 is coupled to the audio coder 712 to receive the digital input signals from the audio coder 712. A DSP is a programmable processor, much like a microprocessor, where the circuitry forming DSP is optimized for digital signal processing functions. The operations of the DSP 714 are configurable in response to instructions from other logic, such as microprocessor 722 of the audio module 720 and/or the control/XCVR module (lighting control device) 215, for example, to process, compress, or manipulate or perform mathematical functions like "add", "subtract," or multiply/divide.

The particular operation(s) of the DSP 714 can be selected/defined by instructions, based on a particular application or use case of the lighting system 100. The DSP 714 may utilize, for example, an adaptive algorithm to analyze a waveform of the incoming signals (converted) and/or a waveform of noise associated with the incoming audio waves represented by the digital input signals, and generate a digital output signal. Depending on the instructions to the DSP 714 and its corresponding signal processing configuration, the digital output signal, for example, may represent a responsive result, for example, a lighting command, to control an operation of a light source in the area of the luminaire, or the digital output signal may represent at least one of a phase shifted waveform or an inverted polarity waveform relative to the waveform of the noise. When the digital output signal is processed to generate a responsive result that is, for example, a lighting command, the responsive result is supplied to the control/XCVR module (lighting control device) 215 to control an operation of the light source 206 in the area of the luminaire 104 in FIG. 1, for example, control of light intensity, color temperature, or pre-set scenes. The responsive result may, for example, further correspond to a user's vocal command or "cry" for help, a noise indicative of human presence in an area, or a noise with a pre-defined signature of a gunshot, glass breaking, etc. In another implementation, the responsive result is a command to another device in the area to control additional operations in the system, for example, HVAC, building access and security, or other BMS operations and functions such as network status and reporting, audio file recording and playback, establishing audio communication channels, or relay of web queries and corresponding responses.

In an implementation, an audio module 720 is coupled to an output of the audio front end device 710. The audio module includes a microprocessor 722 and a memory 724. The output from the audio front end device 710 to the audio module 720 is the digital output signal from the DSP 714.

The microprocessor 722 of the audio module 720 processes and stores the digital output signal as audio data in the memory 724. The audio data may represent the user's voice command, a cry for help, noise indicative of human presence in the area of the luminaire, or pre-defined noise indicative of a gun shot, glass breaking, etc. The audio data may be stored in, for example, a MP3 format.

When the relay switch 704 is in the B-position, which may occur based upon a control signal from the control/XCVR module 215, a system-initiated command, or other controller device for audio output or speaker function, audio signals supplied from or processed at the audio front end device 710 are audibly output from the sound transducer 702 functioning as a speaker. In particular, at least one of the audio data from the memory 724 may be supplied to the audio front end 710 for processing, for example, by the DSP and/or audio decoder 718 to convert the audio data to a form and signal type for output from the sound transducer 702. The converted audio data signal is supplied to the amplifier 708 to provide an amplified analog signal that is output from the sound transducer 702 via acoustic vibration of the luminaire element.

Figure 8:
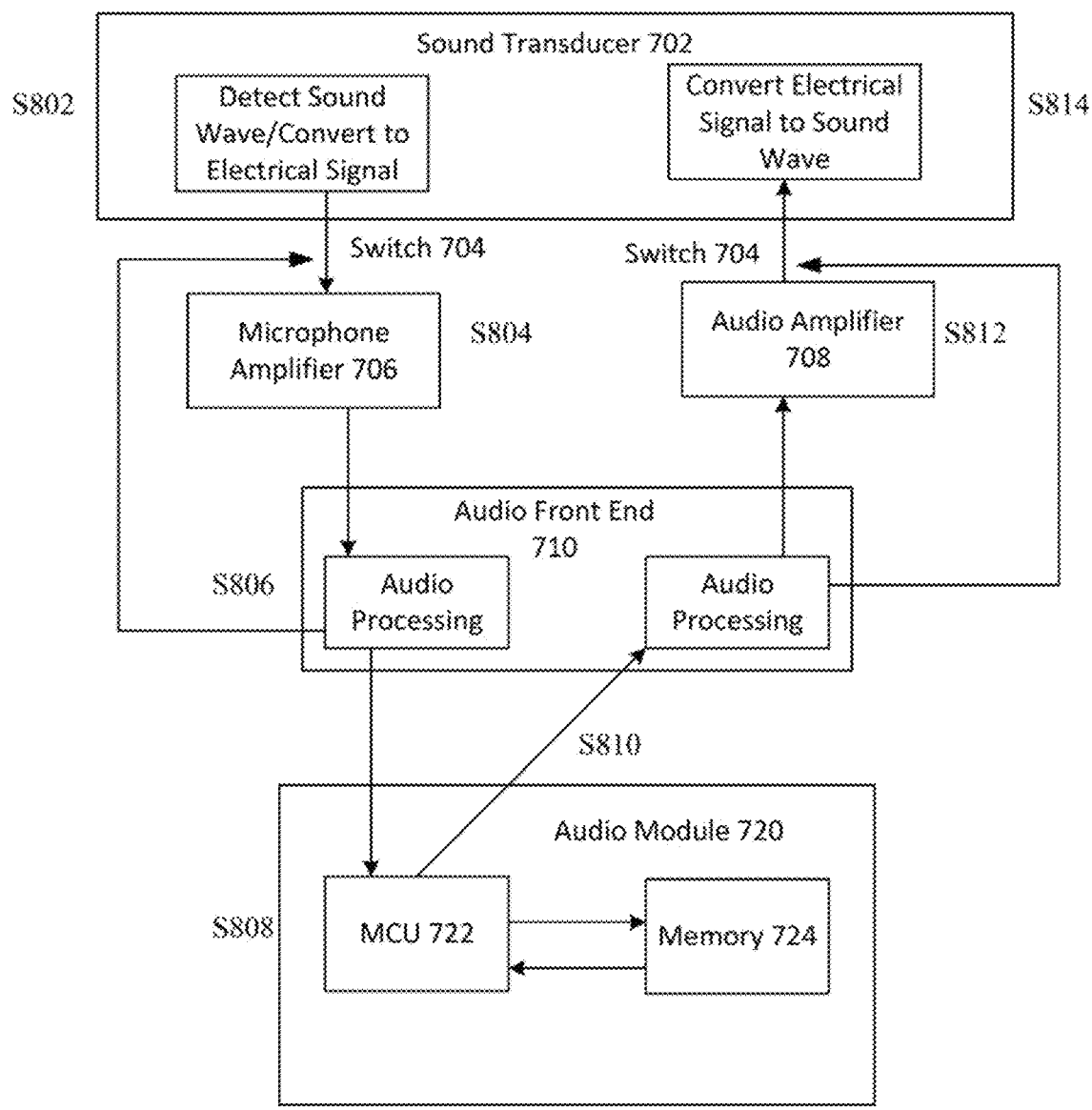
FIG. 8 illustrates an example of the signal flow of the example luminaire having the single sound transducer of FIG. 7 integrated on the luminaire to provide half-duplex operations for both audio pickup and output functions.

FIG. 8 illustrates an example of the signal flow of the luminaire having the half duplex circuitry and sound transducer of FIG. 7 integrated on housing element of the luminaire to provide both audio pickup and output in the lighting system of FIG. 1. As described above, for example, in FIG. 5, housing elements or housing panels 502/504 of a luminaire 500 are configured to be susceptible to acoustic waves and generate outgoing audio waves in a vicinity of the luminaire 500. The luminaire 500 further includes, for example, a two-way sound transducer 202/702 integrated on a surface of one of the luminaire elements, for example housing panel 504, and half duplex circuitry including, for example, the relay switch 704, to provide audio pickup and output functions. In another implementation, the luminaire element may be configured as a diffuser optically coupled to an output of a light source (not illustrated) or as an integral component of the housing of the luminaire. In another implementation, one sound transducer may be integrated on more than one element of the luminaire, where each sound transducer, via the half duplex circuitry, provides both audio pickup and output functions. The sound transducer 702 is configured to respond to vibrations of the luminaire element on which it is attached (mechanically or adhesively) and generate outgoing audio waves. At S802, acoustic or audio waves in the vicinity of the luminaire cause the housing elements of the luminaire to vibrate as the audio waves approach the surface of the luminaire element. As a result, when the relay switch 704 is in the first position, A, the audio pickup or microphone function of the circuit is closed and the connection of the transducer 702 to the winding of the transformer 703 is complete. As such, incoming audio waves are detected. As discussed above, when the relay switch 704 is in the first position, the sound transducer 702 is connected to transformer 703 that is driven by the flow of current through the transformer winding to convert the incoming sound or audio waves to an audio-frequency electrical signal.

At S804, the audio-frequency electrical signal output from the sound transducer 702 and transformer 703 is supplied to amplifier 706 such that an amplitude of the audio-frequency electrical signal is increased.

At S806, the amplified electrical signals are supplied to the audio front end device 710 for audio processing. In the implementation of FIGS. 7 and 8, the audio front end device 710 includes an analog-to-digital converter or an audio coder 712 that converts the analog, amplified electrical signals received from amplifier 706 to digital signals. The audio coder 712 is coupled to a digital signal processor 714 that is configured to receive the digital signals output from the audio coder 712 to generate a responsive result, based upon the digital output signal. Audio processing at the DSP 714 includes, for example, signal conditioning, leveling, balancing, noise suppression, etc., to generate the responsive result. In the implementation of a lighting system or lighting device, the responsive result, for example, a lighting command, is supplied to a lighting control device to control an operation of the light source in the area of the luminaire, for example, ON/OFF, dimming, etc. The responsive result may be transmitted to the control/XCVR module 215 in a signal format or data communication protocol to control additional building management system (BMS) operations and functions such as thermostats, HVAC, sound systems, building access and security, etc. In an example, the responsive result may be an in the format for an audio output via the sound transducer 702 when the relay switch 704 is in the second position, B, based upon the audio pick-up or audio input detected at sound transducer 702 in the A position of the relay switch. The audio front end device 710 further includes a digital-to-analog converter (DAC) or an audio decoder 718 that converts the digital signal output signal from the DSP 714 to an analog signal output in an implementation when the output signal is supplied, without storing, as audio output in the area of the luminaire 700.

At S808, an audio module 720 is coupled to the output of the audio front end device 710 to receive the signal output from the audio decoder 718. The signal output from the audio front end device 710 to the audio module 720 is an analog output signal. The microprocessor 722 of the audio module 720 may be accessible to an audio coder to convert the analog output signal to a digital signal. The microprocessor 722 processes the digital signal output to generate audio data that is stored as an audio file, for example, MP3 format, in memory 724. The audio data may be, for example, a user's voice command or response to control a device accessible to the lighting system, an assistance request, for example, a web-based query, or emergency request, i.e., a cry for help, or a pre-defined noise indicative of a sonic event such as a gun shot or glass breaking, etc.

In an implementation, the processed output signal from the microprocessor 722 may be audio or sound that is output through the sound transducer 702 via vibration of the luminaire element. In particular, at S810, the processed output signal or audio data from the audio module 720 is supplied to the audio front end 710 for any necessary processing and/or conversion to an analog signal. During the processing, the DSP 714 may filter or modify the audio data, which is then converted to an analog audio signal by the audio decoder 718. At S812, the analog audio signal is supplied to an input of audio amplifier 708. The audio amplifier 708 amplifies the audio signal received from the audio front end device 710 to provide an amplified audio output signal. The amplified audio output signal is supplied to the sound transducer 702, via the relay switch 704 in the B position. At S814, the sound transducer 702 is configured to convert the electrical signal to a sound wave by generating an acoustic vibration of the luminaire element to output the audio signal in the vicinity of the luminaire 700.

Figure 9:
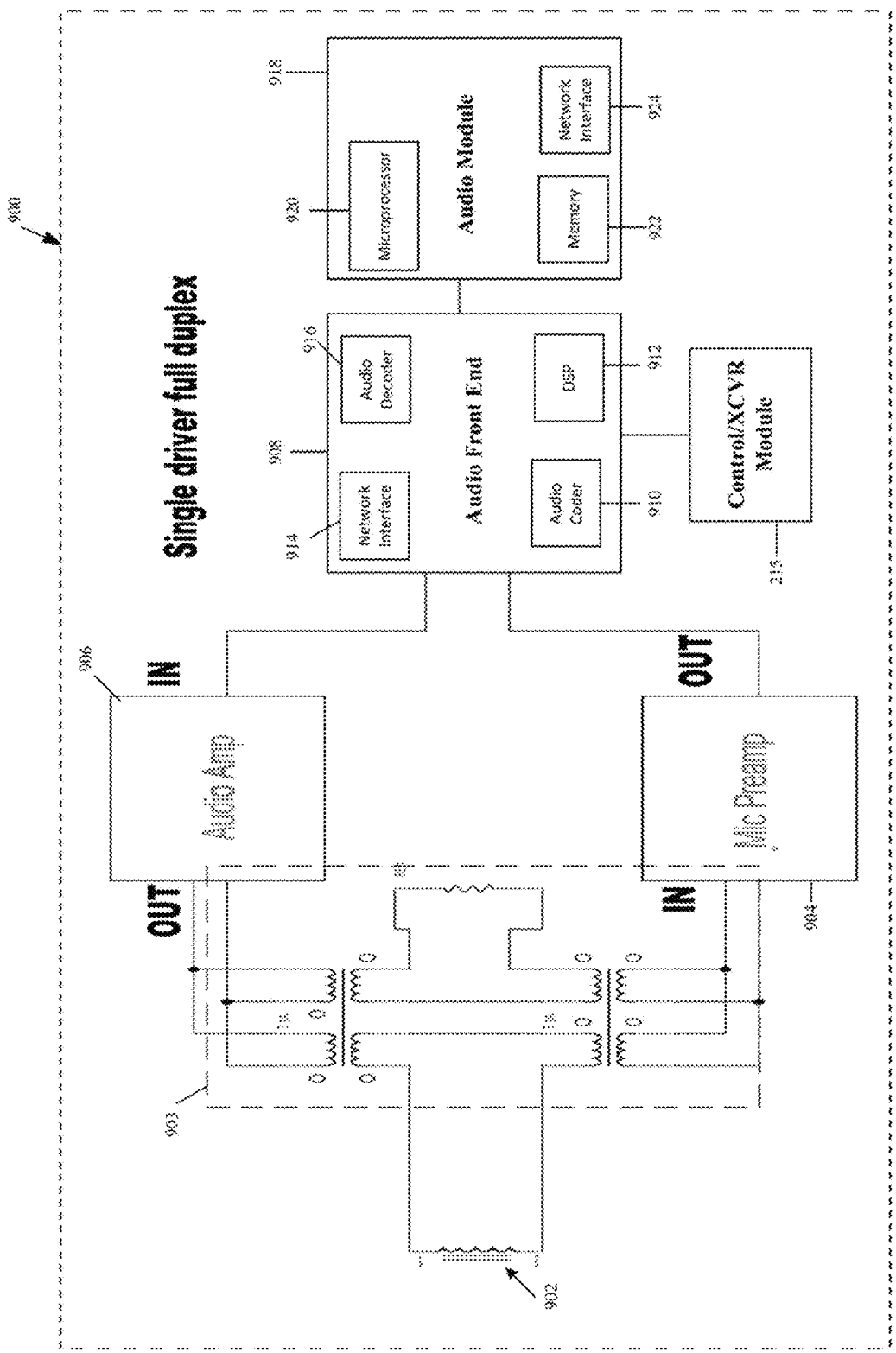
FIG. 9 illustrates example devices and circuitry for a more detailed explanation of a luminaire having full duplex circuitry and a sound transducer integrated on the luminaire that is driven to provide full duplex operations for both audio pickup and output functions in the lighting system of FIG. 1.

FIG. 9 illustrates example devices and circuitry for a more detailed explanation of a luminaire having a full duplex circuit and a two-way sound transducer integrated on the surface of an element (or means) of the luminaire and that is driven to provide full duplex operations for both audio pickup and output functions in the lighting system of FIG. 1. The luminaire element is amenable to acoustic frequency vibrations generated by the transducer or by incoming audio waves. The element is a part of the luminaire that otherwise is provided for purposes of structure or some lighting related function. Examples of the luminaire element (or means), on which the two-way sound transducer may be integrated, include (but are not limited to) a panel or other integral housing component of the luminaire, a reflector optically coupled to an output of the light source, a diffuser optically coupled to an output of the light source, baffles, a waveguide, or any other optical/structural component of the luminaire. Additional components of the luminaire such as the power supply, driver circuit, control/XVCR, and light source are a part of the luminaire 900, and are described above. For ease of explanation, the description and illustration of these components are not repeated here.

As show in FIG. 9, the luminaire 900 includes the sound transducer 902 integrated on a surface of an element of the luminaire 900. The sound transducer 902 is coupled to hybrid circuitry 903 that converts the two wire (leads) circuitry of the sound transducer 902 to a four wire circuit, i.e., a four port transformer having windings. The hybrid circuit 903 provides two-way communication by the sound transducer 902. In particular, the sound transducer 902 via the hybrid circuit 903 can simultaneously function as a microphone and speaker, i.e., permits users to speak and listen at the same time in an area of the luminaire 900. The hybrid circuit 903 further includes an electronic component such as a resistor to provide balancing or impedance matching for the hybrid circuitry connection to the two leads of the sound transducer 902.

As discussed above, the sound transducer 902 is configured to respond to an acoustic vibration of the luminaire housing element. The vibrations on the panel of the luminaire result in acoustic waves that act upon the diaphragm created by the sound transducer contacting the surface of the luminaire element. The sound transducer 902 also is configured to respond to audio frequency electrical signals to cause an acoustic vibration of the luminaire housing element and thereby generate outgoing audio waves in the vicinity of the luminaire.

As illustrated, the sound transducer 902 has two leads to provide physical and electrical connection to the hybrid circuitry 903. The hybrid circuitry 903 provides a two-wire to four-wire conversion, essentially to provide electrical input signals going to the two-way transducer 902 via the two wires forming the transducer leads and to receive vibration responsive electrical signals from the two-way transducer 902 via the same two wires forming the transducers leads. The drawing shows the hybrid circuitry 903 by way of example as a multi-winding transformer arrangement with a balance impedance. Other forms of two-wire to four-wire conversion circuits, such as operational amplifiers and/or switched digital circuits, may be used to perform the two-wire to four-wire conversion.

When a sound is detected in an area of the luminaire 900, the sound transducer 902 functions as an audio pickup device. The sound transducer 902 "receives" or detects incoming sound waves in an area of the luminaire 900. Sound transducer 902 converts the incoming/received sound waves to electrical signals. In the hybrid circuit example, the electrical signals produced in response to the incoming sound waves are converted, via a connection and flow of current through the windings of the transformer illustrated in the lower portion of the hybrid circuit 903, to audio frequency electrical signals and supplied to the input of the microphone pre-amplifier 904 which amplifies the audio-frequency of the electrical signals output by sound transducer 902. The amplified signals are analog signals representing the detected incoming audio signals. The amplified signals from the amplifier 904 are supplied to the audio front end device 908. In the example illustrated in FIG. 9, the amplifier 904 is located outside the audio front end device 908. In another example, the amplifier 904 is located in the audio front end device 908.

In the opposite direction, analog signals applied to the input of the audio amplifier 906 and supplied, via a connection and flow of current through the windings of the transformer illustrated in the upper portion of the hybrid circuit 903, as audio drive signals input to the sound transducer 902. In response to these audio drive signals, the sound transducer 902 vibrates the element of the luminaire to produce responsive output sound waves in the vicinity of the luminaire.

In one implementation, the audio front end device 908 receives amplified analog audio signals from the amplifier 904. The amplified analog signals represent the detected incoming audio signals in the vicinity of the luminaire 104 as discussed above with respect to FIG. 1. The audio front end device 908 includes an audio coder 910 that converts the analog audio signals to digital signals. A digital signal processor (DSP) 912 is coupled to the audio coder 910 to receive the digital signals from the audio coder 910. A DSP is a programmable processor, much like a microprocessor, where the circuitry forming DSP is optimized for digital signal processing functions. The operations of the DSP 912 are configurable in response to instructions from other logic, such as microprocessor 920 of the audio module 918 and/or the control/XCVR module (lighting control device) 215, for example, to process, compress, or manipulate or perform mathematical functions like "add", "subtract," or multiply/divide.

The particular operation(s) of the DSP 912 can be selected/defined by instructions, based on a particular application or use case of the lighting system 100. The DSP 912 may utilize, for example, an adaptive algorithm to analyze a waveform of the incoming signals (converted) and/or a waveform of noise associated with the incoming audio waves represented by the digital input signals, and generate a digital output signal. Based on the instructions to the DSP 912 and the corresponding signal processing configuration, the digital output signal, for example, may represent a responsive result, for example, a lighting command, to control an operation of a light source in the area of the luminaire, or the digital output signal may represent at least one of a phase shifted waveform or an inverted polarity waveform relative to the waveform of the noise. When the digital output signal is processed to generate a responsive result that is, for example, a lighting command, the responsive result is supplied to the control/XCVR module (lighting control device) 215 to control an operation of the light source 206 in the area of the luminaire 104 in FIG. 1, for example, control of light intensity, color temperature, or pre-set scenes. In another implementation, the responsive result is a command to another device in the area of the luminaire to control additional operations in the system, for example, HVAC, building access and security, or other BMS operations and functions such as network status and reporting, audio file recording and playback, establishing audio communication channels, and relay of web queries and response.

In an implementation, an audio module 918 is coupled to an output of the audio front end device 908. The audio module includes a microprocessor 920 and a memory 922. The output from the audio front end device 908 to the audio module 918 is the digital output signal from the DSP 912. The microprocessor 920 of the audio module 918 processes and stores the digital output signal as audio data in the memory 922. The audio data may represent the user's voice command, a cry for help, noise indicative of human presence in the area of the luminaire, or pre-defined noise indicative of a gun shot, glass breaking, etc. The audio data may be stored in, for example, a MP3 format.

When the sound transducer 902 functions as an audio output or speaker, audio signals supplied from or processed at the audio front end device 908 are audibly output from the sound transducer 902 via generated acoustic vibrations of the housing elements. In particular, at least one of the audio data from the memory 922 may be supplied to the audio front end 908 for processing, for example, by the DSP 912 and/or audio decoder 916 to convert the audio data to a form and signal type for output from the sound transducer 902. The converted audio data signal is supplied to the amplifier 906 to provide an amplified analog signal that is output from the sound transducer 902. Examples of audio output as real-time or pre-recorded audio in the vicinity of the luminaire include, but are not limited to, white noise, alarms, music, intercom or public announcements (PA), pre-recorded messages, system commissioning functions.

Figure 10:
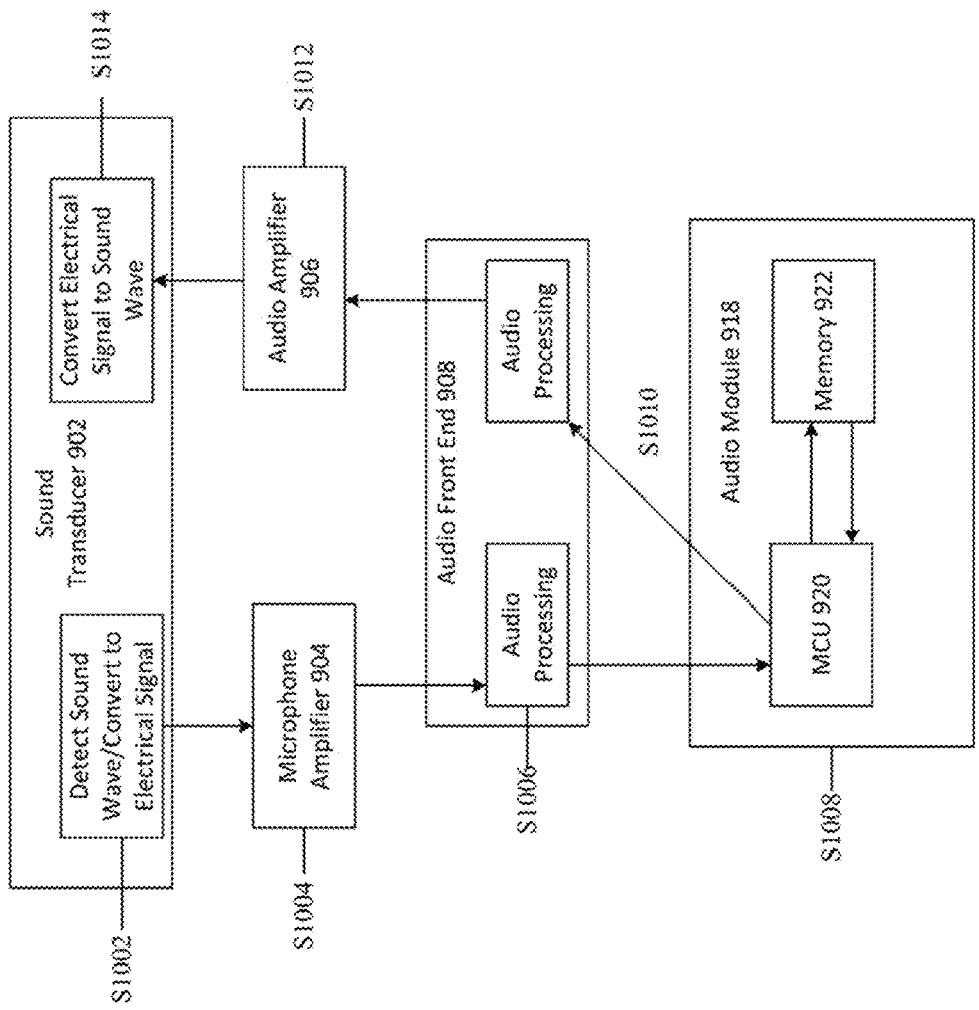
FIG. 10 illustrates an example of the signal flow of the luminaire having the single sound transducer of FIG. 9 integrated on the luminaire to provide full-duplex operations for both audio pickup and output functions.

FIG. 10 illustrates an example of the signal flow of the luminaire having the full duplex circuitry and the sound transducer of FIG. 9 integrated on the luminaire to provide both audio pickup and output in the lighting system of FIG. 1. As described above, for example, in FIG. 5, luminaires elements such as housing panels 502/504 of a luminaire 500 are configured to be susceptible to acoustic waves in a vicinity of the luminaire 500. The luminaire 500 further includes, for example, a sound transducer 202/902 integrated on a surface of one of the luminaire elements, for example housing panel 504, and full duplex circuitry 903 including, for example, a transformer having four separate windings, to simultaneously provide audio pickup and output functions. Alternatively, the panels may be configured as a diffuser optically coupled to an output of a light source (not illustrated) or as an integral component of the housing of the luminaire. Alternatively, one sound transducer may be integrated on more than one housing element of the luminaire, where each sound transducer, via the full duplex circuitry, simultaneously provides both audio pickup and output functions. The sound transducer 902 is configured to respond to vibrations of the housing elements of the luminaire on which the sound transducer is attached (mechanically or adhesively). At S1002, acoustic or audio waves in a vicinity of the luminaire cause the elements of the luminaire to vibrate as the audio waves approach the surface of the luminaire. As a result, the sound transducer 902 detects the incoming audio waves. The sound transducer 902 is connected to transformer of the hybrid circuitry 903 which is driven by the flow of current through the windings of the transformer to convert the incoming sound or audio waves to an audio-frequency electrical signal.

At S1004, because the signals passing through the hybrid circuitry 903 suffer a signal loss, the audio-frequency electrical signals output from the sound transducer 902 and hybrid circuit 903 are supplied to amplifier 904 such that an amplitude of the audio-frequency electrical signal is increased.

At S1006, the amplified electrical signals are supplied to the audio front end device 908 for audio processing. In the implementation of FIGS. 9 and 10, the audio front end device 908 includes an analog-to-digital converter or an audio coder 910 that converts the analog, amplified electrical signals received from amplifier 904 to digital output signals. The audio coder 910 is coupled to a digital signal processor 912 that is configured to receive the digital output signals from the audio coder 910 to generate a responsive result, based upon the digital signal output signal. Audio processing at the DSP 912 includes, for example, signal conditioning, leveling, balancing, noise suppression, etc., to generate the responsive result. In the implementation of a lighting system, the responsive result, for example, a lighting command, is supplied to a lighting control device to control an operation of the light source in the area of the luminaire, for example, ON/OFF, dimming, etc. The responsive result may be transmitted to the control/XCVR module 215 in a signal format or data communication protocol to control additional building management system (BMS) operations and functions such as thermostats, HVAC, sound systems, building access and security, etc. In an example, the responsive result may be an in a format for an audio output via the sound transducer 902 based upon the audio pick-up or audio input detected at sound transducer 902. As indicated above, examples of audio output as real-time or pre-recorded audio in the vicinity of the luminaire include, but are not limited to, white noise, alarms, music, intercom or public announcements (PA), pre-recorded messages, system commissioning functions. The audio front end device 908 further includes a digital-to-analog converter (DAC) or an audio decoder 916 that converts the digital signal output signal from the DSP 912 to an analog signal output in an implementation when the output signal is supplied, without storing, as audio output in the area of the luminaire 900.

At S1006, an audio module 918 is coupled to the output of the audio front end device 908 to receive the analog signal output from the audio decoder 916. The signal output from the audio front end device 908 to the audio module 918 is an analog output signal. The microprocessor 920 of the audio module 918 may be accessible to an audio coder to convert the analog output signal to a digital signal. The microprocessor 920 processes the digital signal output to generate audio data that is stored as an audio file, for example, MP3 format, in memory 922. The audio data may be, for example, a user's voice command or response to control a device accessible to the lighting system, an assistance request or emergency request, i.e., a cry for help, noise indicative of a sonic event such as a gun shot or glass breaking, etc.

In an implementation, the processed output signal from the microprocessor 920 may be audio output through the sound transducer 902. In particular, at S1010, the processed output signal or audio data from the audio module 918 is supplied to the audio front end 908 for any necessary processing and/or converting to an analog signal. During the processing, the DSP 912 may filter or modify the audio data, which is then converted to an analog audio signal by the audio decoder 916. At S1012, the analog audio signal is supplied to an input of audio amplifier 906. The audio amplifier 906 amplifies the audio signal received from the audio front end device 908 to provide an amplified audio output signal. The amplified audio output signal is supplied to the sound transducer 902. At S1014, the sound transducer 902 is configured to convert the electrical signal to a sound wave to output the audio signal in the vicinity of the luminaire 900.

Figure 11A:
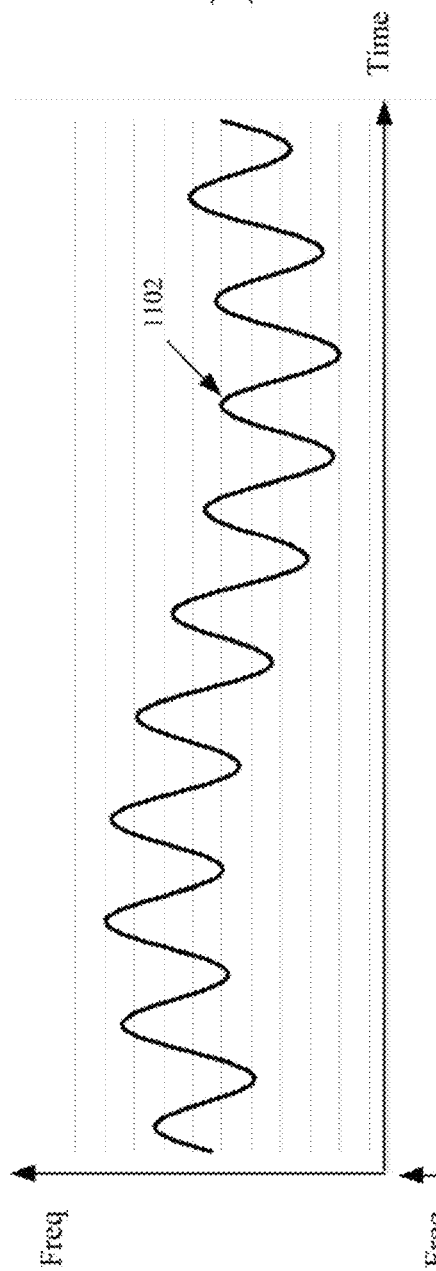
FIGS. 11A, 11B and 11C illustrate an example of signal processing used in the audio front end device of FIG. 1 to subtract an audible input from a total detected audio signal to provide a resulting audio signal output at a surface of the luminaire in the lighting system of FIG. 1.
Figure 11B:
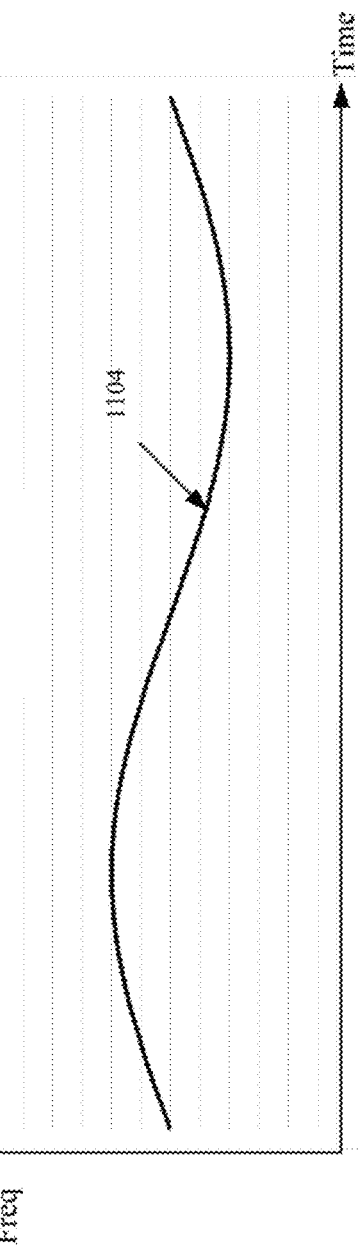
Figure 11C:
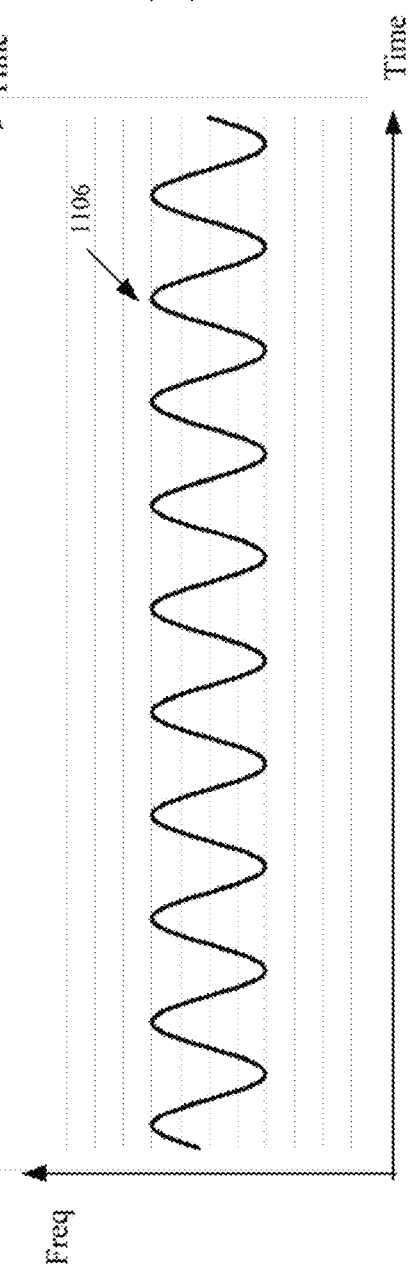

FIGS. 11A, 11B and 11C illustrate an example of signal processing that may be used in the audio front end device to substrate an audible output from a total detected audio signal to provide a resulting audio signal output when the single sound transducer provides a speaker function in the luminaire 104 in the lighting system of FIG. 1. As illustrated in FIG. 11A, a total signal curve 1102 represents an unfiltered, incoming sound wave or signal that is detected by the sound transducer 702 (half duplex circuitry)/902 (full duplex circuitry). The total signal curve 1102 is inclusive of an audible input, such as a human voice, in a vicinity of the luminaire, and any other noise or sounds in the vicinity. Additional sounds, for example, may include at least some expected cross-talk from other noise/sound producing objects on or near the luminaire or deployed elsewhere within the area of the luminaire. FIG. 11B illustrates an example audio wave 1104 such as cross-talk in an area. During the signal processing in the audio front end device 112, a digital signal processor (DSP) may apply an algorithm to subtract the expected cross-talk 1104 from the total signal curve 1102. After processing to remove the cross-talk 1104 or other extraneous sound in the area of the luminaire, a resulting curve 1106 of FIG. 11C represents the filtered, actual sound wave of the audible input at the sound transducer. The sound wave of the audible input may be processed, for example, to more accurately detect a spoken instruction, and thereby generate an audio responsive command for use by the lighting control device, for example, to control a light source or other control operations in a vicinity of the luminaire. Alternatively, the processed audio may be saved to, for example, memory 724 or 922 for audio output, via the speaker function of the sound transducer.

The subject matter disclosed herein may be implemented in various forms or utilized in various application and is not limited to the above descriptions. For example, U.S. patent application Ser. No. 15/866,659, filed Jan. 10, 2018, titled "Occupancy Counting By Sound", the entire contents of which are incorporated herein for all purposes, discloses systems and method to determine the location of detected sound relative to the position of a microphone accessible to a light fixture. In place of the microphone of U.S. application Ser. No. 15/866,659, the disclosed sound transducer or exciter of the current application may be implemented on a surface of an element of the light fixture in order to detect sound in an area, count occupants, and determine a location of detected sound relative to the position of the sound transducer or exciter on the light fixture.

In another example, the disclosed sound transducer may be applied to provide active noise cancellation. U.S. application Ser. No. 15/948,401, filed Apr. 9, 2018, titled "Active Sound Control In A Lighting System", the entire contents of which are incorporated herein for all purposes, discloses a lighting system including a sound reduction device having an pick up microphone and an audio output source. The sound reduction device controls sound in an illuminated are associated with incoming sound. In place of the sound reduction device of U.S. application Ser. No. 15/948,401, at least one sound transducer, as disclosed herein providing both audio pick up and audio output functions, may be implemented on a surface of an element of a luminaire in the vicinity of the incoming audio.

In another example, the disclosed sound transducer may be applied to provide voice assistance for lighting or building management control with light or sound feedback. U.S. patent application Ser. No. 15/933,752, filed Mar. 23, 2018, titled "Controller With Peripheral Visual Feedback", the entire contents of which are incorporated herein for all purposes, discloses a control pod for lighting or building management control with light or sound feedback that includes a user input responsive sensor configured to detect user input in an area of the control pod. Instead of using a microphone in a separate wall mounted control pod as in the Ser. No. 15/933,752 application, an example based on the present disclosure might implement the user input responsive microphone, via a luminaire mounted sound transducer or exciter as disclosed herein to detect incoming user input of a control command to cause a transmitter circuit to send a control signal to a device to implement a function corresponding to the detected control command.

In another example, the disclosed sound transducer may be applied to provide voice assistance for lighting or building management control with light or sound feedback. U.S. patent application Ser. No. 15/631,441, filed Jun. 23, 2017, titled "Lighting Centric Indoor Location Based Service With Speech-Based User Interface", the entire contents of which are incorporated herein for all purposes, a user interface for a location based service, for example, in a retail environment, is responsive to a user's speech. Requested information may be provided as audible responses via display. The system provides appropriate responses to speech inputs based on location and/or location tracking of the user at the premises, for example, to provide navigation guidance to a selected product in a store in response to a user's spoken request. The user interface and information processing may be implemented in intelligent luminaires and/or other components of a lighting system, e.g. without direct user contact or use of the user's mobile device.

In other examples, the disclosure herein of a sound transducer implemented on an element of a luminaire to provide both audio pick up and audio output may be applied to audio based positioning for security or safety applications, for example, a pre-defined or distinctive sound of a gun shot, a sound of broken glass, an alarm system, search and rescue, monitoring for wind, earthquake, or equipment vibrations, or other audible event can be detected by the sound transducer implemented on a surface of a luminaire and functioning as an audio pick-up and audio output device in which the incoming audio is detected and processed to provide responsive result that is audibly output for a particular system operation.

In another example, the disclosure herein of a two-way sound transducer implemented on a surface of an element of a luminaire can be applied for sound staging for multiple luminaires in which the detection of incoming audio in a vicinity of the sound transducer and luminaire can be processed and used to project/output sound evenly throughout a space, or project sound in a certain direction, e.g., for direction guidance or to focus sound to a specific user.

In another example, the disclosure herein of a two-way sound transducer implemented on a surface of an element of a luminaire can be integrated with phone systems or to capture phone calls to project to a room for both audio pick-up and audio output functions, e.g. conference calls, with room-to-room intercoms, or to enhance person-to-person voice communication in a large room, e.g., amplify an individual speaker through an area.

In another example, U.S. Pat. No. 9,462,663, issued to Aggarwal et al., discloses an example of a device and lighting system that support an interactive user interface through the lighting device(s), for example, to control lighting operations at the premises and/or to provide a portal for information access (where the information obtained and provided to the user may come from other equipment at the premises or from network communications with off-premises systems). For example, the device and/or system can provide voice recognition/command type interface via the lighting device and network to obtain information, to access other applications/functions, etc. For example, a user in the lighted space can ask for information such as a stock quote or for a weather forecast for the current or a different location, check his/her calendar and/or the calendar of someone else and can ask the system to schedule a meeting. A server sends the information back to the lighting device (or possibly to another device) with the appropriate output capability, for presentation to the user as an audible or visual output. In place of the microphone and audio speakers of U.S. Pat. No. 9,462,663, the disclosure herein of a two-way sound transducer implemented on a surface of an element of a luminaire may be used to provide both a microphone function to detect incoming audio waves in a vicinity of the luminaire, and a speaker function to generate outgoing audio waves.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A lighting device, comprising:
    a luminaire, including:
        a light source;
        a luminaire element comprising as at least one of: an integral housing component of the luminaire, a reflector optically coupled to an output of the light source, or a diffuser optically coupled to an output of the light source; and
        a sound transducer integrated on a surface of the luminaire element of the luminaire so as to respond to vibration of the luminaire element to detect incoming audio waves and to vibrate the luminaire element to generate outgoing audio waves in the vicinity of the luminaire;
    a lighting control device to control a operation of the light source and light output in an area to be illuminated by the luminaire;
    duplex circuitry coupled to electrical terminals of the sound transducer, wherein the duplex circuitry is configured to:
        generate a first electrical signal representing the incoming audio waves in the vicinity of the luminaire; and
        supply a second electrical signal to cause the sound transducer to generate the outgoing audio waves in the vicinity of the luminaire; and
    at least two amplifiers coupled to and accessible to the electrical terminals of the sound transducer, wherein a first of the amplifiers receives and amplifies the first electrical signal generated by the duplex circuitry, and a second of the amplifiers amplifies an output from an audio front end device used to generate the second electrical signal supplied to the sound transducer for generation of outgoing audio waves in the vicinity of the luminaire.

2. The lighting device of claim 1, wherein:
    the first electrical signal is directly proportional to an amplitude of the incoming audio wave in the vicinity of the luminaire; and
    the outgoing audio waves generated in the vicinity of the luminaire are directly proportional to the second electrical signal.

3. The lighting device of claim 1, wherein the audio front end device is coupled to an output of the duplex circuitry, and comprises an audio coder responsive to analog electrical signals from the duplex circuitry, and an audio decoder configured to provide an analog output signal from the audio front end device.

4. The lighting device of claim 3, wherein the lighting control device comprises:
    a processor coupled to the audio front end device; and
    memory coupled to be accessible to the processor, wherein the memory stores programming for execution by the processor and data to be stored or processed by the processor during execution of instructions included in the programming,
    wherein execution of the programming in the memory configures the processor to:
        control the audio front end device to receive the analog electrical signals from the duplex circuitry and provide an output signal to the duplex circuitry; and
        supply a responsive result of the detected incoming audio waves as the outgoing audio waves output from the sound transducer.

5. The lighting device of claim 4, wherein the digital output signal is proportional to the detected incoming audio waves in the vicinity of the luminaire and reduced by a waveform of noise associated with the incoming detected audio waves.

6. The lighting device of claim 4, wherein the processor is further configured to: perform audio signal processing of the digital output signal to generate a responsive result, based upon the digital output signal; and
supply the responsive result to the lighting control device in the vicinity of the luminaire.

7. The lighting device of claim 6, wherein the responsive result is a lighting command to control operation of the light source, and includes audible output generated from outgoing audio waves from the sound transducer.

8. The lighting device of claim 3, wherein the audio front end device further comprises:
a digital signal processor coupled to the audio coder to:
receive digital signals from the audio coder; and
analyze a waveform of noise associated with the incoming audio waves represented by the digital input signals to generate at least one of a phase shifted waveform or an inverted polarity waveform relative to the waveform of the noise.

9. The lighting device of claim 8, further comprising an audio module coupled to the output of the audio front end device to receive the digital signal output.

10. The lighting device of claim 9, wherein the audio module comprises:
a microprocessor configured to process the digital signal output received from the audio front end device to provide audio data representing the incoming detected audio waves reduced by a waveform of noise associated with the incoming detected audio waves; and
memory coupled to the microprocessor, wherein the memory stores the audio data.

11. The lighting device of claim 10, wherein the audio data is accessible to the processor of the lighting control device to control additional operations in the lighting device.

12. The lighting device of claim 1, wherein the sound transducer, luminaire element, and duplex circuitry form a combination audio pick-up and audio output device.

13. The lighting device of claim 1, further comprising:
a data network;
a network interface to enable the luminaire to receive communication via the data network; and
driver circuitry coupled to the light source to provide power to the light source.

14. The lighting device of claim 1, wherein the duplex circuitry is full duplex to provide two-way communications from the sound transducer.

15. The lighting device of claim 14, wherein the full duplex circuitry includes a hybrid circuit configured to convert the electrical terminals of the sound transducer to a four-wire configuration.

16. The lighting device of claim 15, wherein the hybrid circuit includes a four port multi-winding transformer.

17. The lighting device of claim 1, wherein the luminaire element further comprises a waveguide coupled to an output of the sound transducer.

18. A lighting device, comprising:
a luminaire, including:
a light source;
a luminaire element comprising as at least one of: an integral housing component of the luminaire, a reflector optically coupled to an output of the light source, or a diffuser optically coupled to an output of the light source; and
a sound transducer integrated on a surface of the luminaire element of the luminaire so as to respond to vibration of the luminaire element to detect incoming audio waves and to vibrate the luminaire element to generate outgoing audio waves in the vicinity of the luminaire;
a lighting control device to control a operation of the light source and light output in an area to be illuminated by the luminaire;
duplex circuitry coupled to electrical terminals of the sound transducer, wherein the duplex circuitry is configured to:
generate a first electrical signal representing the incoming audio waves in the vicinity of the luminaire; and
supply a second electrical signal to cause the sound transducer to generate the outgoing audio waves in the vicinity of the luminaire,
wherein the duplex circuitry includes a relay switch to provide half-duplex to control two-way functionality of the sound transducer.

19. The lighting device of claim 18, wherein:
a first position of the relay switch enables an audio pick-up function of the sound transducer, and
a second position of the relay switch, different from the first position of the relay switch, enables an audio output functionality of the sound transducer.

20. A lighting device, comprising:
a luminaire, including:
a light source;
acoustic vibration means; and
a two-way sound transducer coupled to the acoustic vibration means;
duplex circuitry, coupled so as to cause the two-way sound transducer, to detect incoming audio waves in the vicinity of the luminaire, and to generate outgoing audio waves in a vicinity of the luminaire, via the acoustic vibration means; and
at least two amplifiers coupled to and accessible to electrical terminals of the sound transducer, wherein a first of the amplifiers receives and amplifies a first electrical signal generated by the duplex circuitry, first electrical signal representing the incoming audio waves, and a second of the amplifiers amplifies an output from an audio front end device used to generate a second electrical signal supplied to the sound transducer for the generation of the outgoing audio waves in the vicinity of the luminaire.

21. The lighting device of claim 20, wherein:
the acoustic vibration means comprises: an integral housing panel of the luminaire, a reflector optically coupled to an output of the light source, a diffuser optically coupled to an output of the light source, or a light waveguide coupled to an output of the light source; and
the two-way sound transducer is integrated on a surface of the housing panel, the reflector, the diffuser, or the light waveguide.

* * * * *